United States Patent
Beall et al.

(10) Patent No.: US 11,753,331 B1
(45) Date of Patent: Sep. 12, 2023

(54) PRECURSOR GLASSES AND GLASS-CERAMICS COMPRISING A CRYSTALLINE PHASE HAVING A JEFFBENITE CRYSTALLINE STRUCTURE

(71) Applicant: CORNING INCORPORATED, Corning, NY (US)

(72) Inventors: George Halsey Beall, Big Flats, NY (US); John Philip Finkeldey, Elkland, PA (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/887,012

(22) Filed: Aug. 12, 2022

(51) Int. Cl.
*C03C 10/00* (2006.01)
*C03B 32/02* (2006.01)

(52) U.S. Cl.
CPC .......... *C03C 10/0045* (2013.01); *C03B 32/02* (2013.01); *C03C 2204/00* (2013.01)

(58) Field of Classification Search
CPC .. C03C 10/0045; C03C 2204/00; C03B 32/02
See application file for complete search history.

(56) References Cited

U.S. PATENT DOCUMENTS

2005/0008051 A1* 1/2005 Sumida ................ H01S 3/0632
372/39

OTHER PUBLICATIONS

Harris et al. ("A New Tetragonal Silicate Mineral Occurring as Inclusions in Lower-Mantle Diamonds", Nature, vol. 387, 1997, p. 486-488).*
Gunter et al. ("Jeffbenite (Mg3Al2Si3O12)", Handbook of Mineralogy, 2016-2017).*
Nestola et al. ("Tetragonal Almandine-Pyrope Phase, TAPP: Finally a Name for it, the New Mineral Jeffbenite", Mineralogical Magazine, vol. 80, Issue 7, 2016, p. 11219-1232).*
Harris et al. ("A New Tetragonal Silicate Mineral Occurring as Inclusions in Lower-Mantle Diamonds", Nature, vol. 387, 1997, p. 486-488) (Year: 1997).*
Gunter et al. ("Jeffbenite (Mg3Al2Si3O12)", Handbook of Mineralogy, 2016-2017) (Year: 2016).*
Nestola et al. ("Tetragonal Almandine-Pyrope Phase, TAPP: Finally a Name for it, the New Mineral Jeffbenite", Mineralogical Magazine, vol. 80, Issue 7, 2016, p. 11219-1232) (Year: 2016).*
Harris, et al., "A New Tetragonal Silicate Mineral Occurring as Inclusions in Lower-Mantle Diamonds", Ature, vol. 387, 1997, pp. 486-488.
M. Gunter, et al., Jeffbenite (Mg3Al2Si3O12), in Handbook of Mineralogy, 2016-17.

(Continued)

*Primary Examiner* — Travis M Figg
(74) *Attorney, Agent, or Firm* — Russell S. Magaziner

(57) ABSTRACT

Disclosed herein are glass-ceramic articles including a crystalline phase comprising a jeffbenite crystalline structure. The glass-ceramic articles may include a first surface, a second surface opposite the first surface, and a perimeter defining a shape of the glass-ceramic article. The glass-ceramic articles may further include a phase assemblage comprising one or more crystalline phases and a glass phase. The one or more crystalline phases may include a crystalline phase having the jeffbenite crystalline structure.

30 Claims, 10 Drawing Sheets

(56) References Cited

OTHER PUBLICATIONS

Nestola, et al., "Tetragonal Almandine-Pyrope Phase, TAPP: Finally a Name for It, The New Mineral Jeffbenite", Mineralogical Magazine, vol. 80, Issue 7, 2016 pp. 1219-1232.
Smyth, et al., "Ferromagnesian Jeffbenite Synthesized at 15 Gpa and 1200° C."; American Mineralogist, vol. 107 No. 3, pp. 405-412.
Wang, et al., "High-Pressure Crystal Structure and Equation of State of Ferromagnesian Jeffbenite: Implications for Stability in the Transition Zone and Uppermost Lower Mantle", Contributions to Mineralogy and Petrology, vol. 176 No. 93, 2021.

* cited by examiner

PRECURSOR GLASSES AND GLASS-CERAMICS COMPRISING A CRYSTALLINE PHASE HAVING A JEFFBENITE CRYSTALLINE STRUCTURE

FIELD

The present specification relates to precursor glasses and glass-ceramic articles made therefrom.

BACKGROUND

Glass articles, such as cover glasses, glass backplanes, housings, and the like, are employed in both consumer and commercial electronic devices, such as smart phones, tablets, portable media players, personal computers, and cameras. The mobile nature of these portable devices makes the devices and the glass articles included therein particularly vulnerable to accidental drops on hard surfaces, such as the ground. Moreover, glass articles, such as cover glasses, may include "touch" functionality, which necessitates that the glass article be contacted by various objects including a user's fingers and/or stylus devices. Accordingly, the glass articles must be sufficiently robust to endure accidental dropping and regular contact without damage, such as scratching. Indeed, scratches introduced into the surface of the glass article may reduce the strength of the glass article as the scratches may serve as initiation points for cracks leading to catastrophic failure of the glass.

Accordingly, a need exists for alternative materials that have improved mechanical properties relative to glass.

SUMMARY

Features and advantages of the precursor glasses and glass-ceramics described herein will be set forth in the detailed description that follows, and in part will be readily apparent to those skilled in the art from that description or recognized by practicing the embodiments described herein, including the detailed description that follows, the claims, as well as the appended drawings.

Aspect 1 includes a glass-ceramic article comprising a first surface; a second surface opposite the first surface; a perimeter defining a shape of the glass-ceramic article; and a phase assemblage comprising one or more crystalline phases and a glass phase, the one or more crystalline phases comprising a jeffbenite crystalline structure.

Aspect 2 includes the glass-ceramic article of Aspect 1, wherein the one or more crystalline phases comprising the jeffbenite crystalline structure is a primary crystalline phase.

Aspect 3 includes the glass-ceramic article of any preceding aspect, wherein the one or more crystalline phases comprising the jeffbenite crystalline structure has a composition according to the formula: $(Mg,R^{2+})_{3+x}(Zr,R^{4+})_x Al_{2-2x}Si_3O_{12}$, where $R^{2+}$ are divalent metal cations, $R^{4+}$ are tetravalent metal cations, and x is greater than or equal to 0 to less than 1.

Aspect 4 includes the glass-ceramic article of any preceding aspect, wherein the one or more crystalline phases comprising the jeffbenite crystalline structure has a composition according to the formula: $(Mg,Fe,Mn,Zn)_{3+x}(Zr,Ti,Sn)_x Al_{2-2x}Si_3O_{12}$, where x is greater than or equal to 0 to less than 1.

Aspect 5 includes the glass-ceramic article of any preceding aspect, wherein the one or more crystalline phases comprising the jeffbenite crystalline structure has a composition according to the formula: $Mg_{3+x}Zr_x Al_{2-2x}Si_3O_{12}$, where x is greater than or equal to 0 to less than 1.

Aspect 6 includes the glass-ceramic article of any preceding aspect, wherein the one or more crystalline phases comprises one or more accessory crystalline phases.

Aspect 7 includes the glass-ceramic article of Aspect 6, wherein the one or more accessory crystalline phases comprises a $ZrO_2$ crystalline phase.

Aspect 8 includes the glass-ceramic article of Aspect 6, wherein the one or more accessory crystalline phases comprises a $ZrTiO_4$ crystalline phase.

Aspect 9 includes the glass-ceramic article of any preceding aspect, wherein the phase assemblage comprises greater than or equal to 25 wt % of the one or more crystalline phases and less than or equal to 75 wt % of the glass phase.

Aspect 10 includes the glass-ceramic article of any preceding aspect, wherein at least some grains of the at least on crystalline phase comprising the jeffbenite crystalline structure have a dimension greater than or equal to 20 nm to less than or equal to 100 nm.

Aspect 11 includes the glass-ceramic article of any preceding aspect, comprising: greater than or equal to 35 mol. % to less than or equal to 65 mol. % $SiO_2$; greater than or equal to 5 mol. % to less than or equal to 20 mol. % $Al_2O_3$; greater than or equal to 10 mol. % to less than or equal to 45 mol. % MgO; greater than or equal to 1 mol. % to less than or equal to 7 mol. % $ZrO_2$; greater than or equal to 0 mol. % to less than or equal to 15 mol. % $Na_2O$; greater than or equal to 0 mol. % to less than or equal to 15 mol. % $K_2O$; greater than or equal to 0 mol. % to less than or equal to 9 mol. % FeO; greater than or equal to 0 mol. % to less than or equal to 1 mol. % $MnO_2$; and greater than or equal to 0 mol. % to less than or equal to 12 mol. % ZnO.

Aspect 12 includes the glass-ceramic article of any preceding aspect, comprising greater than or equal to 48 mol. % to less than or equal to 54 mol. % $SiO_2$.

Aspect 13 includes the glass-ceramic article of any preceding aspect, comprising greater than or equal to 9 mol. % to less than or equal to 13 mol. % $Al_2O_3$.

Aspect 14 includes the glass-ceramic article of any preceding aspect, comprising greater than or equal to 1 mol. % to less than or equal to 15 mol. % $Na_2O$.

Aspect 15 includes the glass-ceramic article of any preceding aspect, comprising greater than or equal to 1 mol. % to less than or equal to 15 mol. % $K_2O$.

Aspect 16 includes the glass-ceramic article of any preceding aspect, wherein $Na_2O$ (mol. %)+$K_2O$ (mol. %) is greater than or equal to 2 mol. % to less than or equal to 15 mol. %.

Aspect 17 includes the glass-ceramic article of any preceding aspect, wherein $Na_2O$ (mol. %)/($Na_2O$ (mol. %)+$K_2O$ (mol. %)) is greater than or equal to 0.3.

Aspect 18 includes the glass-ceramic article of any preceding aspect, further comprising greater than or equal to 0.3 mol. % to less than or equal to 7 mol. % $TiO_2$.

Aspect 19 includes the glass-ceramic article of any preceding aspect, wherein $ZrO_2$ (mol. %)+$TiO_2$ (mol. %) is greater than or equal to 2 mol. %.

Aspect 20 includes the glass-ceramic article of any preceding aspect, wherein $ZrO_2$ (mol. %)/($ZrO_2$ (mol. %)+$TiO_2$ (mol. %)) is greater than or equal to 0.3.

Aspect 21 includes the glass-ceramic article of any preceding aspect, comprising greater than or equal to 1 mol. % to less than or equal to 12 mol. % ZnO.

Aspect 22 includes the glass-ceramic article of any preceding aspect, further comprising less than or equal to 3 mol. % $Li_2O$.

Aspect 23 includes the glass-ceramic article of any preceding aspect, wherein the glass-ceramic article is substantially free of $Li_2O$.

Aspect 24 includes the glass-ceramic article of any preceding aspect, further comprising greater than or equal to 1 mol. % to less than or equal to 8 mol. % BaO.

Aspect 25 includes the glass-ceramic article of any preceding aspect, further comprising greater than or equal to 0.2 mol. % to less than or equal to 1.7 mol. % of at least one of CaO and SrO.

Aspect 26 includes the glass-ceramic article of any preceding aspect, wherein the glass-ceramic article is substantially free of $P_2O_5$.

Aspect 27 includes a glass-ceramic article comprising: greater than or equal to 35 mol. % to less than or equal to 65 mol. % $SiO_2$; greater than or equal to 5 mol. % to less than or equal to 20 mol. % $Al_2O_3$; greater than or equal to 10 mol. % to less than or equal to 45 mol. % MgO; greater than or equal to 1 mol. % to less than or equal to 7 mol. % $ZrO_2$; greater than or equal to 0 mol. % to less than or equal to 15 mol. % $Na_2O$; greater than or equal to 0 mol. % to less than or equal to 15 mol. % $K_2O$; greater than or equal to 0 mol. % to less than or equal to 9 mol. % FeO; greater than or equal to 0 mol. % to less than or equal to 1 mol. % $MnO_2$; and greater than or equal to 0 mol. % to less than or equal to 12 mol. % ZnO, wherein the glass-ceramic article comprises a glass phase and a crystalline phase having a jeffbenite crystalline structure.

Aspect 28 includes the glass-ceramic article of Aspect 27, wherein the crystalline phase comprising the jeffbenite crystalline structure has a composition according to the formula: $(Mg,R^{2+})_{3+x}(Zr,R^{4+})_x Al_{2-2x}Si_3O_{12}$, where $R^{2+}$ are divalent metal cations, $R^{4+}$ are tetravalent metal cations, and x is greater than or equal to 0 to less than 1.

Aspect 29 includes the glass-ceramic article of Aspects 27-28, wherein the crystalline phase comprising the jeffbenite crystalline structure has a composition according to the formula: $(Mg,Fe,Mn,Zn)_{3+x}(Zr,Ti,Sn)_x Al_{2-2x}Si_3O_{12}$, where x is greater than or equal to 0 to less than 1.

Aspect 30 includes the glass-ceramic article of Aspects 27-29, wherein the crystalline phase comprising the jeffbenite crystalline structure has a composition according to the formula: $Mg_{3+x}Zr_x Al_{2-2x}Si_3O_{12}$, where x is greater than or equal to 0 to less than 1.

Aspect 31 includes the glass-ceramic article of Aspects 27-30, wherein the crystalline phase comprising the jeffbenite crystalline structure is a primary crystalline phase.

Aspect 32 includes the glass-ceramic article of Aspects 27-31, comprising greater than or equal to 48 mol. % to less than or equal to 54 mol. % $SiO_2$.

Aspect 33 includes the glass-ceramic article of Aspects 27-32, comprising greater than or equal to 9 mol. % to less than or equal to 13 mol. % $Al_2O_3$.

Aspect 34 includes the glass-ceramic article of Aspects 27-33, comprising greater than or equal to 1 mol. % to less than or equal to 15 mol. % $Na_2O$.

Aspect 35 includes the glass-ceramic article of Aspects 27-34, comprising greater than or equal to 2 mol. % to less than or equal to 5 mol. % $Na_2O$.

Aspect 36 includes the glass-ceramic article of Aspects 27-35, comprising greater than or equal to 1 mol. % to less than or equal to 15 mol. % $K_2O$.

Aspect 37 includes the glass-ceramic article of Aspects 27-36, comprising greater than or equal to 1 mol. % to less than or equal to 5 mol. % $K_2O$.

Aspect 38 includes the glass-ceramic article of Aspects 27-37, wherein $Na_2O$ (mol. %)+$K_2O$ (mol. %) is greater than or equal to 2 mol. % to less than or equal to 15 mol. %.

Aspect 39 includes the glass-ceramic article of Aspects 27-38, wherein $Na_2O$ (mol. %)/($Na_2O$ (mol. %)+$K_2O$ (mol. %)) is greater than or equal to 0.3.

Aspect 40 includes the glass-ceramic article of Aspects 27-39, further comprising greater than or equal to 0.3 mol. % to less than or equal to 7 mol. % $TiO_2$.

Aspect 41 includes the glass-ceramic article of Aspects 27-40, wherein $ZrO_2$ (mol. %)+$TiO_2$ (mol. %) is greater than or equal to 2 mol. %.

Aspect 42 includes the glass-ceramic article of Aspects 27-41, wherein $ZrO_2$ (mol. %)/($ZrO_2$ (mol. %)+$TiO_2$ (mol. %)) is greater than or equal to 0.3.

Aspect 43 includes the glass-ceramic article of Aspects 27-42, comprising greater than or equal to 1 mol. % to less than or equal to 12 mol. % ZnO.

Aspect 44 includes the glass-ceramic article of Aspects 27-43, further comprising less than or equal to 3 mol. % $Li_2O$.

Aspect 45 includes the glass-ceramic article of Aspects 27-44, wherein the glass-ceramic article is substantially free of $Li_2O$.

Aspect 46 includes the glass-ceramic article of Aspects 27-45, further comprising greater than or equal to 1 mol. % to less than or equal to 8 mol. % BaO.

Aspect 47 includes the glass-ceramic article of Aspects 27-46, further comprising greater than or equal to 0.2 mol. % to less than or equal to 1.7 mol. % of at least one of CaO and SrO.

Aspect 48 includes the glass-ceramic article of Aspects 27-47, wherein the glass-ceramic article is substantially free of $P_2O_5$.

Aspect 49 includes the glass-ceramic article of Aspects 27-48, wherein the glass-ceramic article has a density of greater than or equal to 265 $g/cm^3$ to less than or equal to 295 $g/cm^3$.

Aspect 50 includes the glass-ceramic article of Aspects 27-49, further comprising a $ZrO_2$ crystalline phase.

Aspect 51 includes the glass-ceramic article of Aspects 27-50, further comprising a $ZrTiO_4$ crystalline phase.

Aspect 52 includes the glass-ceramic article of Aspects 27-51, wherein at least some grains of the crystalline phase having the jeffbenite crystalline structure have a dimension greater than or equal to 20 nm to less than or equal to 100 nm.

Aspect 53 includes a consumer electronic device comprising: a housing having a front surface, a back surface, and side surfaces; electrical components provided at least partially within the housing, the electrical components including at least a controller, memory, and a display, the display being at or adjacent the front surface of the housing; and the glass-ceramic article of any preceding aspect at least one of disposed over the display and forming a portion of the housing.

Aspect 54 includes a method of making a glass-ceramic article, the method comprising: heat treating a precursor glass comprising $SiO_2$, $Al_2O_3$, MgO, and $ZrO_2$ to nucleate one or more crystalline phases in the precursor glass, wherein the one or more crystalline phases comprises a jeffbenite crystalline structure and the precursor glass optionally comprises one or more of FeO, MnO$_2$ and ZnO; and growing the one or more crystalline phases in a glass phase.

Aspect 55 includes the method of making a glass-ceramic article of Aspect 54, wherein the heat treating comprises: heating the precursor glass to a first temperature greater than or equal to 700° to less than or equal to 950° C.; and maintaining the precursor glass at the first temperature for a first time greater than or equal to 0.25 hours to less than or equal to 6 hours.

Aspect 56 includes the method of making a glass-ceramic article of Aspects 54-55, wherein the heat treating further comprises: heating the precursor glass to a second temperature greater than or equal to 750° to less than or equal to 950° C.; and maintaining the precursor glass at the second temperature for a second time greater than or equal to 0.25 hours to less than or equal to 6 hours.

Aspect 57 includes the method of making a glass-ceramic article of Aspects 54-56, wherein the crystalline phase having the jeffbenite crystalline structure is a primary crystalline phase.

Aspect 58 includes the method of making a glass-ceramic article of Aspects 54-57, wherein the jeffbenite crystalline phase has a composition according to the formula: $(Mg,R^{2+})_{3+x}(Zr,R^{4+})_x Al_{2-2x}Si_3O_{12}$, where x is greater than or equal to 0 to less than 1.

Aspect 59 includes the method of making a glass-ceramic article of Aspects 54-58, wherein the jeffbenite crystalline phase has a composition according to the formula: $(Mg,Fe,Mn,Zn)_{3+x}(Zr,Ti,Sn)_x Al_{2-2x}Si_3O_{12}$, where x is greater than or equal to 0 to less than 1.

Aspect 60 includes the method of making a glass-ceramic article of Aspects 54-59, wherein the jeffbenite crystalline phase has a composition according to the formula: $Mg_{3+x}Zr_x Al_{2-2x}Si_3O_{12}$, where x is greater than or equal to 0 to less than 1.

Aspect 61 includes the method of making a glass-ceramic article of Aspects 54-60, wherein the glass-ceramic article comprises a phase assemblage comprising the one or more crystalline phases and a glass phase.

Aspect 62 includes the method of making a glass-ceramic article of Aspect 61, wherein the one or more crystalline phases comprises one or more accessory crystalline phases.

Aspect 63 includes the method of making a glass-ceramic article of Aspect 62, wherein the one or more accessory crystalline phases comprises $ZrO_2$.

Aspect 64 includes the method of making a glass-ceramic article of Aspect 62, wherein the one or more accessory crystalline phases comprises $ZrTiO_4$.

Aspect 65 includes the method of making a glass-ceramic article of Aspect 61, wherein the phase assemblage comprises greater than or equal to 25 wt. % of the one or more crystalline phases and less than or equal to 75 wt. % of the glass phase.

Aspect 66 includes the method of making a glass-ceramic article of Aspects 54-61, wherein at least some grains of the crystalline phase having the jeffbenite crystalline structure have a dimension greater than or equal to 20 nm to less than or equal to 100 nm.

Aspect 67 includes a sheet of glass-ceramic, comprising: a first major surface and a second major surface facing away from the first major surface, edges forming a perimeter of the first and second major surfaces and extending between the first and second major surfaces; wherein a thickness of the sheet is defined as distance between the first and second major surfaces, a width of the sheet is defined as a distance along the first major surface orthogonal to the thickness and between the edges, and a length of the sheet is defined as a distance along the first major surface orthogonal to both the width and thickness and between the edges; wherein the width is greater than or equal to the thickness; wherein the length is greater than or equal to the width; and a body between the first major surface, the second major surface, and the edges, wherein the body comprises glass-ceramic, wherein the glass-ceramic comprises a crystalline phase having a jeffbenite crystalline structure.

Aspect 68 includes the glass sheet of Aspect 67, wherein grains of the crystalline phase having the jeffbenite crystalline structure are homogeneously distributed throughout the glass-ceramic of the body.

Aspect 69 includes the sheet of Aspects 67-68, wherein grains of the crystalline phase having the jeffbenite crystalline structure are randomly oriented within the glass-ceramic of the body.

Aspect 70 includes the sheet of Aspects 67-69, wherein grains of the crystalline phase having the jeffbenite crystalline structure overlap and interlock with one another within the glass-ceramic of the body.

Aspect 71 includes the sheet of Aspects 67-70, wherein the glass-ceramic has isotropic material properties.

Aspect 72 includes the sheet of Aspects 67-71, wherein the thickness is greater than or equal to 200 μm and less than or equal to 5 mm.

Aspect 73 includes the sheet of Aspects 67-72, wherein the length and the width are both greater than 5 mm.

Aspect 74 includes the sheet of Aspects 67-73, wherein the first major surface has an area greater than or equal to 25 mm$^2$.

Aspect 75 includes the sheet of Aspects 67-74, wherein a volume of glass-ceramic in the body is greater than or equal to 25 mm$^3$.

Aspect 76 includes the sheet of Aspects 67-75, wherein the body consists essentially of the glass-ceramic, and wherein the body is at least partially translucent such that at least 20% of light of 400 to 800 nanometers wavelength directed into the thickness of the sheet passes through the body.

Aspect 77 includes a method of manufacturing a glass-ceramic, comprising: heat-treating precursor glass comprising nucleation sites to grow grains of a crystalline phase having a jeffbenite crystalline structure from the nucleation sites within the precursor glass, to form a glass-ceramic comprising the crystalline phase having the jeffbenite crystalline structure and residual glass; and growing the grains of the crystalline phase having the jeffbenite crystalline structure during the heat-treating so that at least some of the grains of the crystalline phase having the jeffbenite crystalline structure have a dimension greater than or equal to 20 nm.

Aspect 78 includes the method of Aspect 77, wherein the growing occurs at atmospheric pressure.

Aspect 79 includes the method of Aspects 77-78, wherein temperature of the precursor glass during the heat-treating remains less than 1500K throughout the heat-treating.

Aspect 80 includes the method of Aspects 77-79, wherein, after the growing, at least some of the grains of the crystalline phase having the jeffbenite crystalline structure overlap and interlock with one another within the residual glass of the glass-ceramic.

Aspect 81 includes the method of Aspects 77-80, wherein, after the growing, at least some of the grains of the crystalline phase having the jeffbenite crystalline structure have a dimension less than or equal to 5 μm.

Aspect 82 includes the method of Aspects 77-81, wherein the nucleation sites are positioned within the precursor glass such that the grains of the crystalline phase having the jeffbenite crystalline structure are homogenously distributed within the glass-ceramic.

Aspect 83 includes the method of Aspects 77-82, wherein the heat-treating is such that the grains of the crystalline phase having the jeffbenite crystalline structure are grown throughout the glass-ceramic.

Aspect 84 includes the method of Aspects 77-83, wherein the grains of the crystalline phase having the jeffbenite crystalline structure are grown in random orientations with respect to one another and encased within the residual glass of the glass-ceramic.

Aspect 85 includes the method of Aspects 77-84, wherein the crystalline phase having the jeffbenite crystalline structure is a primary crystalline phase of the glass-ceramic.

Aspect 86 includes the method of Aspects 77-85, wherein after the growing the glass-ceramic has isotropic material properties.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
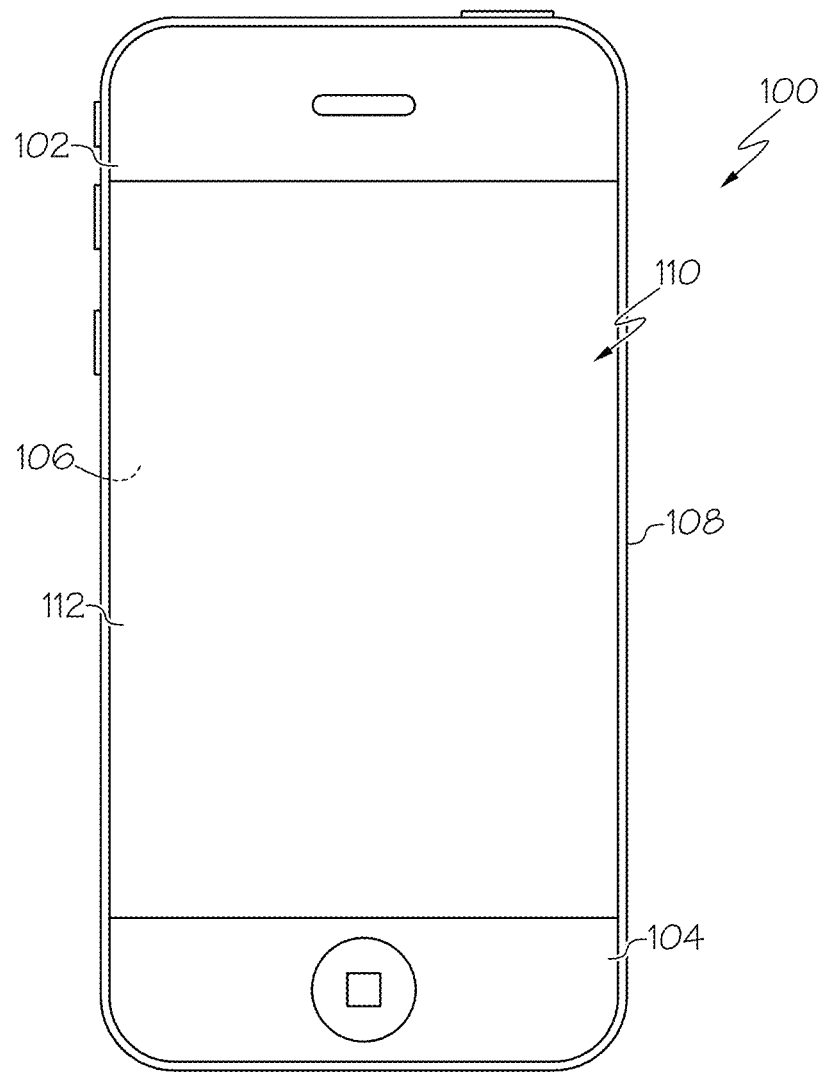
FIG. 1 is a top view of an electronic device comprising a glass-ceramic article according to one or more embodiments described herein.

Reference will now be made in detail to various embodiments of precursor glasses and glass-ceramic articles made therefrom. According to embodiments, a glass-ceramic article includes a first surface, a second surface opposite the first surface, and a perimeter defining a shape of the glass-ceramic article. The glass-ceramic article may further include a phase assemblage comprising one or more crystalline phases and a glass phase, the one or more crystalline phases comprising a crystalline phase comprising a jeffbenite crystalline structure. Various embodiments of precursor glasses, glass-ceramic articles made therefrom, and methods of making glass-ceramic articles will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "substantially free," when used to describe the concentration and/or absence of a particular constituent component in a precursor glass or glass-ceramic composition, means that the constituent component is not intentionally added to the precursor glass or glass-ceramic composition. However, the precursor glass or class-ceramic composition may contain traces of the constituent component as a contaminant or tramp in amounts of less than 0.05 mol. %.

In the embodiments of the precursor glass or glass-ceramic compositions described herein, the concentrations of constituent components (e.g., $SiO_2$, $Al_2O_3$, and the like) are specified in mole percent (mol. %) on an oxide basis, unless otherwise specified.

Transmittance data (total transmittance) is measured with a Lambda 950 UV/Vis Spectrophotometer manufactured by PerkinElmer Inc. (Waltham, Mass. USA). The Lambda 950 apparatus was fitted with a 150 mm integrating sphere. Data was collected using an open beam baseline and a Spectralon® reference reflectance disk. For total transmittance (Total Tx), the sample is fixed at the integrating sphere entry point. For diffuse transmittance (Diffuse Tx), the Spectralon® reference reflectance disk over the sphere exit port is removed to allow on-axis light to exit the sphere and enter a light trap. A zero offset measurement is made, with no sample, of the diffuse portion to determine efficiency of the light trap. To correct diffuse transmittance measurements, the zero offset contribution is subtracted from the sample measurement using the equation: Diffuse Tx= Diffuse $_{Measured}$–(Zero Offset*(Total Tx/100)). The scatter ratio is measured for all wavelengths as: (% Diffuse Tx/% Total Tx).

The term "transparent," when used to describe an article herein, refers to an article that has an average transmittance of at least 75% for a light in a wavelength range from 400 nm to 800 nm (inclusive of endpoints) at an article thickness of 0.85 mm.

The term "translucent," unless otherwise specified such as in the claims, when used to describe an article herein, refers to an article that has an average transmittance in a range from 20% to less than 75% for light in a wavelength range from 400 nm to 800 nm (inclusive of endpoints) at an article thickness of 0.85 mm.

The term "opaque," when used to describe a glass-ceramic article formed of a glass-ceramic composition herein, means that the glass-ceramic composition has an average transmittance less than 20% when measured at normal incidence for light in a wavelength range from 400 nm to 800 nm (inclusive of endpoints) at an article thickness of 0.85 mm.

The dimensions of the grains of a crystalline phase or phases of the glass-ceramics described herein are measured using scanning electron microscopy and image analysis.

The term "melting point," as used herein, refers to the temperature at which the viscosity of the precursor glass or glass-ceramic composition is 200 poise.

The term "softening point," as used herein, refers to the temperature at which the viscosity of the precursor glass or glass-ceramic composition is $1 \times 10^{7.6}$ poise. The softening point is measured according to the parallel plate viscosity method, which measures the viscosity of inorganic glass from $10^7$ to $10^9$ poise as a function of temperature, similar to ASTM C1351M.

The term "liquidus viscosity," as used herein, refers to the viscosity of the glass-ceramic at the onset of devitrification (i.e., at the liquidus temperature as determined with the gradient furnace method according to ASTM C829-81).

The elastic modulus (also referred to as Young's modulus) of the glass-based article is provided in units of gigapascals (GPa). The elastic modulus of the glass is determined by resonant ultrasound spectroscopy on bulk samples of each glass-based article in accordance with ASTM C623.

Vickers hardness may be measured using ASTM C1326 and C1327 (and its progeny, all herein incorporated by reference) "Standard Test Methods for Vickers Indentation Hardness of Advanced Ceramics," ASTM International, Conshohocken, Pa., US. In some embodiments, the glass-ceramics exhibit such Vickers indentation crack initiation load values after being chemically strengthened via ion exchange.

The fracture toughness may be measured using a chevron notch short beam, according to ASTM C1421-10, "Standard Test Methods for Determination of Fracture Toughness of Advanced Ceramics at Ambient Temperature" prior to ion-exchange strengthening of the glass-ceramic.

Compressive stress (including surface compressive stress) is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" and "DOC" refer to the position in the glass-ceramic where compressive stress transitions to tensile stress.

The phrase "glass precursor" or "precursor glass", as used herein, refers to a glass or glass article containing one or more nucleating agents and/or nucleation sites (e.g., within a body of the material, which may be homogenously distributed therein and throughout the body), which, upon thermal treatment, at least in part causes (e.g., facilitates) the nucleation of at least one crystalline phase in the glass.

Figure 9:
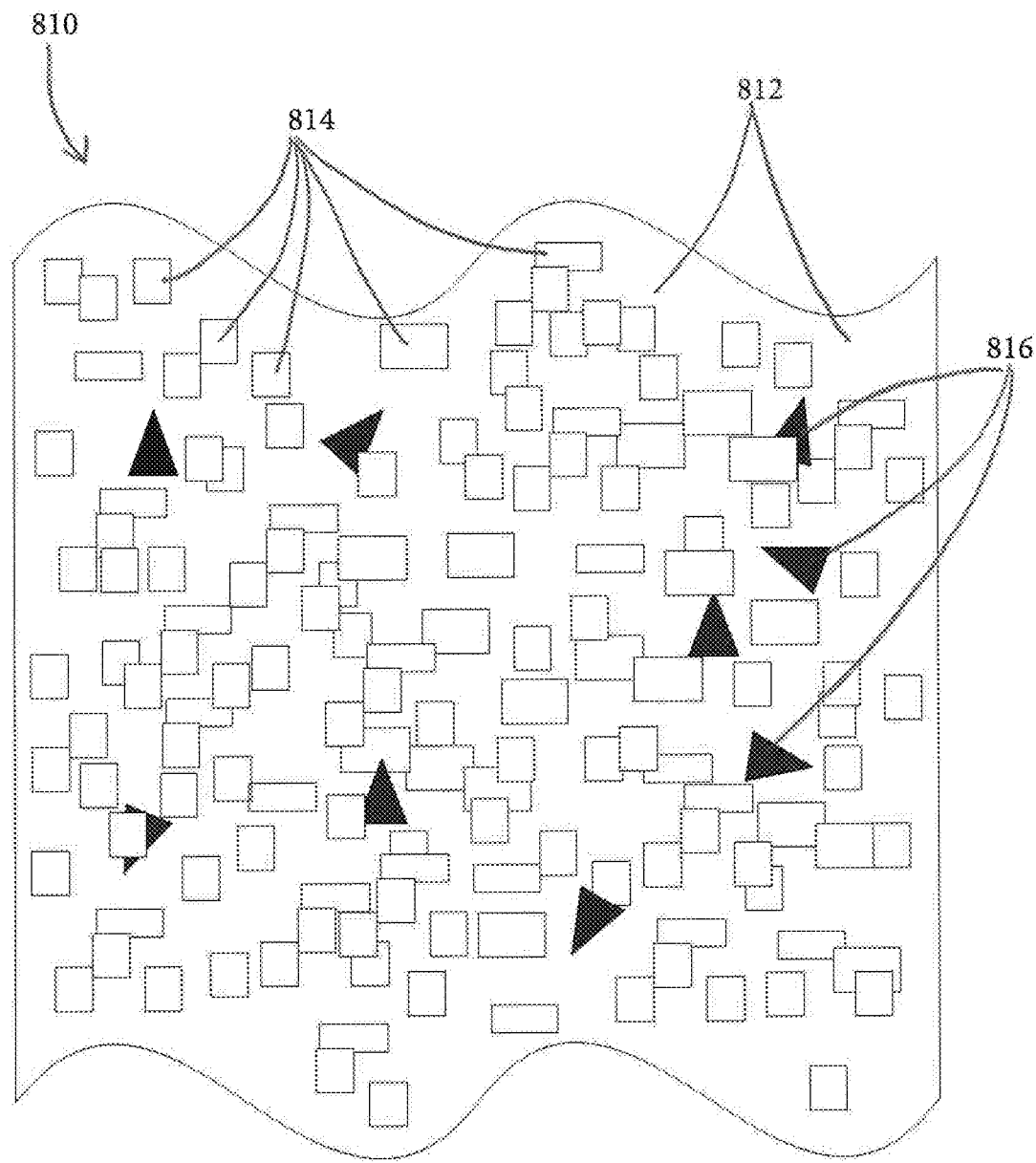
FIG. 9 schematically depicts a glass-ceramic article.

The phrase "glass-ceramic", as used herein, refers to a material or article formed from a precursor glass material following nucleation of at least one crystalline phase in the precursor glass (see generally FIG. 9 and related disclosure).

The phrase "primary crystalline phase," as used herein, refers to a crystalline phase present in the glass-ceramic in an amount (in wt. % of the glass-ceramic) greater than the amount (in wt. % of the glass-ceramic) of any other individual crystalline phases present in the glass-ceramic. For example, if a glass-ceramic comprises crystalline phases A, B, and C and crystalline phase A is the primary crystalline phase, the amount of crystalline phase A in the glass-ceramic is greater than the amount of crystalline phase B in the glass-ceramic and greater than the amount of crystalline phase C in the glass-ceramic.

Articles formed from glass-ceramics generally have improved fracture toughness relative to articles formed from glass. This improvement may be due to the presence of crystalline grains in the glass-ceramics, which may impede crack growth. The fracture toughness of glass-ceramics may be improved by decreasing the number of grains per unit volume of the glass-ceramic—that is by increasing the size of the grains of the glass-ceramic. However, the transparency or optical transmission of glass-ceramics may decrease with increasing grain size. In particular, the transparency of glass-ceramics may be significantly reduced when the size of the grains is larger than 5 μm. Thus, conventional glass-ceramics may have relatively good mechanical properties (such as fracture toughness) and relatively poor optical characteristics (such as optical transparency or optical transmittance) or relatively poor mechanical properties and relatively good optical characteristics, but not relatively good mechanical properties and relatively good optical characteristics.

In addition, some glass-ceramics may be strengthened by ion exchange processes in which smaller alkali metal ions in the glass-ceramic are exchanged for larger alkali metal ions from, for example, a bath of molten alkali metal salts. As an example, a lithium-containing glass-ceramic may be strengthened by ion exchange by placing the glass-ceramic in a bath of molten alkali metal salts, such as salts of sodium and/or potassium, thereby facilitating the exchange of lithium ions in the glass-ceramic with sodium and/or potassium ions in the bath. However, the recent demand for lithium for use in various applications has increased the cost of lithium raw materials and reduced availability, thereby increasing the overall cost for producing glass-ceramics containing lithium which may be strengthened by ion exchange. The glass-ceramics described herein do not require lithium to facilitate desirable ion exchange performance.

Disclosed herein are precursor glasses and glass-ceramics formed therefrom which mitigate the aforementioned problems.

Referring now to FIG. 9 by way of example, a glass-ceramic article 810 is schematically depicted according to one or more embodiments shown and described herein. As noted herein, the phrase "glass-ceramic" refers to a material or article formed from a precursor glass material following nucleation of at least one crystalline phase in the precursor glass. Thus, the glass-ceramic article 810 includes both a glass phase 812 (e.g., amorphous glass; single-phase glass or multi-phase glass) and polycrystalline ceramic (e.g., grains of the primary crystalline phase 814, optionally with grains of accessory crystalline phase(s) 816). The glass phase 812 may be referred to as "residual glass" or a "residual glass phase." Conceivably, the grains of the crystalline phases 814, 816 may be unevenly distributed or directionally grown, such as by localizing heat via laser, or by positioning and/or orienting nucleation sites to guide growth of the grains of the crystalline phases 814, 816, and contemplated embodiments include such properties; however, generally in the glass-ceramics disclosed herein, the grains of the crystalline phases 814, 816 may be uniformly or homogenously distributed and randomly oriented within the glass phase 812, such as throughout some, most or all of the glass-ceramic article 810. Further, once nucleated from the precursor glass, the grains of the crystalline phases 814, 816 may be grown to contact one another, overlap one another, interlock with one another, and fill more of the volume of the glass-ceramic article 810. Growing the grains of the crystalline phases 814, 816 to different sizes may influence properties of the glass-ceramic article 810, and such properties may be isotropic with grains of the crystalline phases 814, 816 uniformly, homogenously positioned, and randomly oriented when the grains of the crystalline phases 814, 816 have grain sizes and the articles have sizes, as disclosed herein. After nucleation and growth of the grains of the crystalline phases 814, 816, the glass phase 812 surrounds (e.g., contacts, envelops, encapsulates) individual or clusters of the grains of the crystalline phases 814, 816. The glass phase 812 of the glass-ceramic may have more than one glass phase 812 and/or more than one crystalline phase, as shown with crystalline phases 814, 816.

Embodiments of the glass-ceramics described herein, such as the embodiment depicted in FIG. 9, have a phase assemblage comprising one or more crystalline phases and a glass phase. At least one of the crystalline phases comprises a jeffbenite crystalline structure. A crystalline phase having a jeffbenite crystalline structure refers to a crystalline phase identified as jeffbenite by x-ray diffraction (XRD) analysis. For example, XRD data (such as an XRD spectrum) collected from a sample of glass-ceramic material, along with general compositional information about the composition of the sample (such as the batch composition from which the sample was prepared) may be input into MDI Jade powder XRD Analysis software from Materials Data Inc. The software utilizes the input information, along with the International Center For Diffraction Data's Powder Diffraction File version 4 database (ICDD PDF-4 database), to identify the crystalline phases in the sample based on the compositional information of the sample and the crystalline structure of the phases as determined from the XRD data. In embodiments, the phase assemblage of the glass-ceramic may have at least one crystalline phase comprising a jeffbenite crystalline structure as determined by this methodology.

Based on the foregoing, unless otherwise specified or further clarified herein, such as in the claims or elsewhere, the phrase "jeffbenite crystalline structure" means a crystalline phase or grains of a crystalline phase identified by XRD analysis as jeffbenite, as described herein, and the further characterizations provided herein may aid in clarifying various embodiments and forms of crystalline phases having a jeffbenite crystalline structure that may be included and claimed.

In embodiments, a crystalline phase having a jeffbenite crystalline structure is the primary crystalline phase in the glass-ceramics. The crystalline phase having a jeffbenite crystalline structure may have attributes (e.g., compositional, molecular structural, microstructural) in common with jeffbenite.

Jeffbenite, named after Jeffrey Harris and Ben Harte, is a mineral recently discovered as inclusions in diamonds from "super-deep" (e.g., >300 km deep) within the mantle of the Earth. Prior to its naming, jeffbenite was called tetragonal-almandine-pyrope-phase ("TAPP"). Jeffbenite may comprise tetragonal $Mg_3Al_2Si_3O_{12}$. The term "tetragonal" refers to the otherwise cubic lattice being stretched along one of its lattice vectors to become a rectangular prism with a square base ("a by a") and height ("c," different from "a"), such as within the space group I42d. The tetragonal crystal structure of jeffbenite may include cell edge parameter $\alpha$ of about 6.5, such as 6.5231(1), such as within 0.1 thereof, and parameter c of about 18.2, such as 18.1756(3) angstroms, such as within 0.1 thereof. A crystalline phase having a jeffbenite crystalline structure may have the tetragonal structure of jeffbenite, as described herein.

The density of jeffbenite (itself) may be about 3.6 g/cm³, such as 3.576 g/cm³, such as within 0.1 g/cm³ thereof. The microhardness of jeffbenite (itself) may be about 7, such as within 1 thereof. Jeffbenite (itself) may be uniaxial (−) with refractive indexes ω of about 1.7, such as 1.733(5), such as within 0.1 thereof, and ε of about 1.7, such as 1.721, such as within 0.1 thereof.

While $Mg_3Al_2Si_3O_{12}$ is an ideal form of jeffbenite, jeffbenite can be generally described as a stoichiometric garnet composition, similar to pyrope ($Mg_3Al_2(SiO_4)_3$)-almandine ($Fe_3Al_2(SiO_4)_3$), but with a tetragonal crystalline structure, and may include other elements. Put another way, structurally, jeffbenite and crystals having a jeffbenite crystalline structure may be described as $(M1)(M2)_2(M3)_2(T1)(T2)_2O_{12}$ where M1 comprises magnesium (e.g., is mostly magnesium), M2 comprises aluminum (e.g., is mostly aluminum), M3 comprises magnesium (e.g., is mostly magnesium), and T1 and T2 comprise silicon (are both mostly silicon), and where two tetrahedra of such crystalline structures do not share any oxygen with one another. Jeffbenite may be categorized as an orthosilicate, such as a silicate containing the tetrahedra group $SiO_4$ where the ratio of silicon to oxygen is 1 to 4.

In embodiments of the glass-ceramics described herein, the crystalline phase comprising the jeffbenite crystalline structure may at least comprise, mostly consist of (>50 wt. %), consist essentially of, or be tetragonal $Mg_3Al_2Si_3O_{12}$.

In embodiments of the glass-ceramics described herein, the crystalline phase comprising the jeffbenite crystalline structure (or a portion thereof) may be modified by the addition of zirconia ($ZrO_2$). Without intending to be bound by any theory, alumina (i.e., an aluminum contribution) may be at least partially replaced in the jeffbenite crystalline structure by magnesia (i.e., a magnesium contribution) and zirconia (i.e., a zirconium contribution). In such embodiments, the crystalline phase comprising the jeffbenite crystalline structure (or a portion thereof) may have a composition according to the following formula: $Mg_{3+x}Zr_xAl_{2-2x}Si_3O_{12}$, where x is greater than or equal to 0 to less than 1. In embodiments, x may be greater than or equal to 0 to less than or equal to 0.6. For example, without limitation, the crystalline phase having the jeffbenite crystalline structure (or a portion thereof) may have the composition(s): $Mg_3Al_2Si_3O_{12}$, $Mg_{3.1}Zr_{0.1}Al_{1.8}Si_3O_{12}$, $Mg_{3.2}Zr_{0.2}Al_{1.6}Si_3O_{12}$, $Mg_{3.3}Zr_{0.3}Al_{1.4}Si_3O_{12}$, $Mg_{3.4}Zr_{0.4}Al_{1.2}Si_3O_{12}$, $Mg_{3.5}Zr_{0.5}AlSi_3O_{12}$, $Mg_{3.6}Zr_{0.6}Al_{0.8}Si_3O_{12}$, $Mg_{3.7}Zr_{0.7}Al_{0.6}Si_3O_{12}$, $Mg_{3.8}Zr_{0.8}Al_{0.4}Si_3O_{12}$, or $Mg_{3.9}Zr_{0.9}Al_{0.2}Si_3O_{12}$.

In embodiments of the glass-ceramics described herein, the crystalline phase comprising the jeffbenite crystalline structure (or a portion thereof) may be further modified by the addition of titania, tin oxide, iron oxide (FeO), manganese oxide, and/or zinc oxide. For example, titania (i.e., a titanium contribution) and/or tin oxide (i.e., a tin contribution) may be substituted for up to 50% of the zirconium in the jeffbenite crystalline structure. Similarly, iron oxide (i.e., an iron contribution), manganese oxide (i.e., a manganese contribution), and/or zinc oxide (i.e., a zinc contribution) may be substituted for a portion of the magnesium in the jeffbenite crystalline structure. In such embodiments, the crystalline phase comprising the jeffbenite crystalline structure (or a portion thereof) may have a composition according to the following formula: $(Mg,Fe,Mn,Zn)_{3+x}(Zr,Ti,Sn)_xAl_{2-2x}Si_3O_{12}$, where x is greater than or equal to 0 to less than 1. In embodiments, x may be greater than or equal to 0 to less than or equal to 0.6. For example, without limitation, the crystalline phase having the jeffbenite crystalline structure (or a portion thereof) may have the composition(s): $(Mg,Fe,Mn,Zn)_3Al_2Si_3O_{12}$, $(Mg,Fe,Mn,Zn)_{3.1}(Zr,Ti,Sn)_{0.1}Al_{1.8}Si_3O_{12}$, $(Mg,Fe,Mn,Zn)_{3.2}(Zr,Ti,Sn)_{0.2}Al_{1.6}Si_3O_{12}$, $(Mg,Fe,Mn,Zn)_{3.3}(Zr,Ti,Sn)_{0.3}Al_{1.4}Si_3O_{12}$, $(Mg,Fe,Mn,Zn)_{3.4}(Zr,Ti,Sn)_{0.4}Al_{1.2}Si_3O_{12}$, $(Mg,Fe,Mn,Zn)_{3.5}(Zr,Ti,Sn)_{0.5}AlSi_3O_{12}$, $(Mg,Fe,Mn,Zn)_{3.6}(Zr,Ti,Sn)_{0.6}Al_{0.8}Si_3O_{12}$, $(Mg,Fe,Mn,Zn)_{3.7}(Zr,Ti,Sn)_{0.7}Al_{0.6}Si_3O_{12}$, $(Mg,Fe,Mn,Zn)_{3.8}(Zr,Ti,Sn)_{0.8}Al_{0.4}Si_3O_{12}$, or $(Mg,Fe,Mn,Zn)_{3.9}(Zr,Ti,Sn)_{0.9}Al_{0.2}Si_3O_{12}$. In these embodiments, it should be understood that the Fe, Mn, Zn, Ti, and Sn components in the formulas are each optional and the composition may be formed without one or more of these elements. For example, the composition may be free of Fe, but may include Mn, Ti, and Sn, or be free of Sn but include Fe, Mn, Zn and Ti. As such, it should be understood that the above referenced formulas can be written without one or more of Fe, Mn, Zn, Ti, and Sn.

It should be understood that other substitutions and modifications to the crystalline phase comprising the jeffbenite structure are contemplated and possible. For example, in embodiments of the glass-ceramics described herein, the crystalline phase comprising the jeffbenite crystalline structure (or a portion thereof) may be modified by the addition of metal oxides to the composition as a source of divalent metal cations (expressed as "$R^{2+}$") in substitution for a portion of the magnesium in the jeffbenite crystalline structure. Examples of divalent metal cations include, without limitation, $Ca^{2+}$, $Mn^{2+}$, $Fe^{2+}$, and the like. In these embodiments, the divalent metal cations may have an ionic radius of less than 1 angstrom (0.1 nm). Similarly, the crystalline phase comprising the jeffbenite crystalline structure (or a portion thereof) may be modified by the addition of metal oxides to the composition as a source of tetravalent metal cations (expressed as "$R^{4+}$") in substitution for a portion of the zirconium in the jeffbenite crystalline structure. Examples of tetravalent metal cations include $Ti^{4+}$, $Sn^{4+}$, $Hf^{4+}$, and the like. In such embodiments, the crystalline phase comprising the jeffbenite crystalline structure (or a portion thereof) may have a composition according to the following formula: $(Mg,R^{2+})_{3+x}(Zr,R^{4+})_xAl_{2-2x}Si_3O_{12}$, where x is greater than or equal to 0 to less than 1. In embodiments, x may be greater than or equal to 0 to less than or equal to 0.6. For example, without limitation, the crystalline phase having the jeffbenite crystalline structure (or a portion thereof) may have the composition(s): $(Mg,R^{2+})_3Al_2Si_3O_{12}$, $(Mg,R^{2+})_{3.1}(Zr,R^{4+})_{0.1}Al_{1.8}Si_3O_{12}$, $(Mg,R^{2+})_{3.2}(Zr,R^{4+})_{0.2}Al_{1.6}Si_3O_{12}$, $(Mg,R^{2+})_{3.3}(Zr,R^{4+})_{0.3}Al_{1.4}Si_3O_{12}$, $(Mg,R^{2+})_{3.4}(Zr,R^{4+})_{0.4}Al_{1.2}Si_3O_{12}$, $(Mg,R^{2+})_{3.5}(Zr,R^{4+})_{0.5}AlSi_3O_{12}$, $(Mg,R^{2+})_{3.6}(Zr,R^{4+})_{0.6}Al_{0.8}Si_3O_{12}$, $(Mg,R^{2+})_{3.7}(Zr,R^{4+})_{0.7}Al_{0.6}Si_3O_{12}$, $(Mg,R^{2+})_{3.8}(Zr,R^{4+})_{0.8}Al_{0.4}Si_3O_{12}$, or $(Mg,R^{2+})_{3.9}(Zr,R^{4+})_{0.9}Al_{0.2}Si_3O_{12}$. In these embodiments, it should be understood that the $R^{2+}$ and $R^{4+}$ components in the formulas are each optional and the composition may be formed without one or the other of these elements. As such, it should be understood that the above referenced formulas can be written without one or the other of $R^{2+}$ and $R^{4+}$.

In embodiments, the one or more crystalline phases of the phase assemblage may comprise one or more accessory crystalline phases. The one or more accessory crystalline phases may be present in the glass-ceramic in an amount less than the primary crystalline phase. In embodiments, the one or more accessory crystalline phases may comprise tetragonal zirconia ($ZrO_2$), $ZrTiO_4$, or a combination thereof. However, it should be understood that other accessory crystalline phases may also be present in the resultant glass-ceramic. In embodiments, one or more of the accessory crystalline phases may enter the structure of the crystalline phase having the jeffbenite crystalline structure.

In embodiments, the phase assemblage of the glass-ceramics described herein comprises greater than or equal to 25 wt. % of the one or more crystalline phases by weight of the glass-ceramic article (i.e., wt. %) and less than or equal to 75 wt. % of the glass phase, greater than or equal to 30 wt. % of the one or more crystalline phases and less than or equal to 70 wt. % of the glass phase, greater than or equal to 40 wt. % of the one or more crystalline phases and less than or equal to 60 wt. % of the glass phase, greater than or equal to 50 wt. % of the one or more crystalline phases and less than or equal to 50 wt. % of the glass phase, greater than or equal to 60 wt. % of the one or more crystalline phases and less than or equal to 40 wt. % of the glass phase, greater than or equal to 70 wt. % of the one or more crystalline phases and less than or equal to 30 wt. % of the glass phase, greater than or equal to 80 wt. % of the one or more crystalline phases and less than or equal to 20 wt. % of the glass phase, as determined according to Rietveld analysis of the XRD spectrum. It should be understood that the crystalline phase content or the glass content may be within a sub-range formed from any and all of the foregoing endpoints. In embodiments, the crystalline phase(s) and glass phase may be homogenously distributed throughout the glass-ceramic. It should further be noted that at least some, most (>50 wt %), or essentially all of such crystalline phase may have a jeffbenite crystalline structure (e.g., as identified by XRD; tetragonal, stoichiometrically garnet, $Mg_3Al_2Si_3O_{12}$ and variations thereof).

$SiO_2$ may be the primary glass former in the precursor glass and glass-ceramic compositions described herein and may function to stabilize the network structure of the glass-ceramics. The concentration of $SiO_2$ in the precursor glass and glass-ceramic compositions should be sufficiently high (e.g., greater than or equal to 35 mol. %) to form the crystalline phase when the precursor glass is heat-treated to convert the precursor glass to a glass-ceramic. The amount of $SiO_2$ may be limited (e.g., to less than or equal to 65 mol. %) to control the melting point of the precursor glass or glass-ceramic composition, as the melting temperature of pure $SiO_2$ or high-$SiO_2$ glasses is undesirably high. Thus, limiting the concentration of $SiO_2$ may aid in improving the meltability and the formability of the precursor glass or glass-ceramic composition.

In embodiments, the precursor glass or glass-ceramic composition may comprise from greater than or equal to 35 mol. % to less than or equal to 65 mol. % $SiO_2$. In embodiments, the precursor glass or glass-ceramic composition may comprise $SiO_2$ in an amount greater than or equal to 35 mol. % to less than or equal to 62 mol. %, greater than or equal to 35 mol. % to less than or equal to 59 mol. %, greater than or equal to 35 mol. % to less than or equal to 56 mol. %, greater than or equal to 35 mol. % to less than or equal to 53 mol. %, greater than or equal to 35 mol. % to less than or equal to 50 mol. %, greater than or equal to 35 mol. % to less than or equal to 47 mol. %, greater than or equal to 35 mol. % to less than or equal to 44 mol. %, greater than or equal to 35 mol. % to less than or equal to 41 mol. %, greater than or equal to 35 mol. % to less than or equal to 38 mol. %, greater than or equal to 38 mol. % to less than or equal to 65 mol. %, greater than or equal to 41 mol. % to less than or equal to 65 mol. %, greater than or equal to 42 mol. % to less than or equal to 65 mol. %, greater than or equal to 43 mol. % to less than or equal to 65 mol. %, greater than or equal to 44 mol. % to less than or equal to 65 mol. %, greater than or equal to 45 mol. % to less than or equal to 65 mol. %, greater than or equal to 46 mol. % to less than or equal to 65 mol. %, greater than or equal to 47 mol. % to less than or equal to 65 mol. %, greater than or equal to 48 mol. % to less than or equal to 65 mol. %, greater than or equal to 49 mol. % to less than or equal to 65 mol. %, greater than or equal to 50 mol. % to less than or equal to 65 mol. %, greater than or equal to 51 mol. % to less than or equal to 65 mol. %, greater than or equal to 52 mol. % to less than or equal to 65 mol. %, greater than or equal to 53 mol. % to less than or equal to 65 mol. %, greater than or equal to 54 mol. % to less than or equal to 65 mol. %, greater than or equal to 55 mol. % to less than or equal to 65 mol. %, greater than or equal to 56 mol. % to less than or equal to 65 mol. %, greater than or equal to 57 mol. % to less than or equal to 65 mol. %, greater than or equal to 58 mol. % to less than or equal to 65 mol. %, greater than or equal to 59 mol. % to less than or equal to 65 mol. %, greater than or equal to 60 mol. % to less than or equal to 65 mol. %, greater than or equal to 61 mol. % to less than or equal to 65 mol. %, or any and all sub-ranges formed from any of these endpoints. In some embodiments, the precursor glass or glass-ceramic composition may comprise from greater than or equal to 48 mol. % to less than or equal to 54 mol. % $SiO_2$. In embodiments, the concentration of $SiO_2$ may be greater than or equal to 40 mol. %, 45 mol. %, or 50 mol. %. In embodiments, the concentration of $SiO_2$ may be less than or equal to 65 mol. %, 60 mol. % or 55 mol. %.

Like $SiO_2$, $Al_2O_3$ may also stabilize the glass network and additionally provides improved mechanical properties and chemical durability to the glass-ceramics. The amount of $Al_2O_3$ may also be tailored to the control the viscosity of the precursor glass or glass-ceramic composition. However, if the amount of $Al_2O_3$ is too high, the viscosity of the glass melt may increase. In embodiments, the precursor glass or glass-ceramic composition may comprise from greater than or equal to 5 mol. % to less than or equal to 20 mol. % $Al_2O_3$. In embodiments, the concentration of $Al_2O_3$ in the precursor glass or glass-ceramic composition may be greater than or equal to 5 mol. % to less than or equal to 20 mol. %, greater than or equal to 5 mol. % to less than or equal to 19 mol. %, greater than or equal to 5 mol. % to less than or equal to 18 mol. %, greater than or equal to 5 mol. % to less than or equal to 17 mol. %, greater than or equal to 5 mol. % to less than or equal to 16 mol. %, greater than or equal to 5 mol. % to less than or equal to 15 mol. %, greater than or equal to 5 mol. % to less than or equal to 14 mol. %, greater than or equal to 5 mol. % to less than or equal to 13 mol. %, greater than or equal to 5 mol. % to less than or equal to 12 mol. %, greater than or equal to 5 mol. % to less than or equal to 11 mol. %, greater than or equal to 5 mol. % to less than or equal to 10 mol. %, greater than or equal to 5 mol. % to less than or equal to 9 mol. %, greater than or equal to 5 mol. % to less than or equal to 8 mol. %, greater than or equal to 5 mol. % to less than or equal to 7 mol. %, greater than or equal to 5 mol. % to less than or equal to 6 mol. %, greater than or equal to 6 mol. % to less than or equal to 20 mol. %, greater than or equal to 7 mol. % to less than or equal to 20 mol. %, greater than or equal to 8 mol. % to less than or equal to 20 mol. %, greater than or equal to 9 mol. % to less than or equal to 20 mol. %, greater than or equal to 10 mol. % to less than or equal to 20 mol. %, greater than or equal to 11 mol. % to less than or equal to 20 mol. %, greater than or equal to 12 mol. % to less than or equal to 20 mol. %, greater than or equal to 13 mol. % to less than or equal to 20 mol. %, greater than or equal to 14 mol. % to less than or equal to 20 mol. %, greater than or equal to 15 mol. % to less than or equal to 20 mol. %, greater than or equal to 16 mol. % to less than or equal to 20 mol. %, greater than or equal to 17 mol. % to less than or equal to 20 mol. %, greater than or equal to 18 mol. % to less than or equal to 20 mol. %, greater than or equal to 19 mol. % to less than or equal to 20 mol. %, or any and all sub-ranges formed from any of these endpoints. In embodiments, the concentration of $Al_2O_3$ in the precursor glass or glass-ceramic composition may be from greater than or equal to 9 mol. % to less than or equal to 13 mol. %. In embodiments, the concentration of $Al_2O_3$ in the precursor glass or glass-ceramic composition may be greater than or equal to 5 mol. %, 7 mol. %, or 10 mol. %. In embodiments, the concentration of Al$_2$O$_3$ may be less than or equal to 20 mol. %, 15 mol. %, 12 mol. %, or 10 mol. %.

In embodiments, the precursor glass or glass-ceramic composition may comprise from greater than or equal to 10 mol. % to less than or equal to 45 mol. % MgO. Additions of MgO may increase the elastic modulus of the glass of the precursor glass and resultant glass-ceramic. MgO may also displace Al$_2$O$_3$ in the glass network and create a more open network structure, improving ion mobility in the glass network. In embodiments, the concentration of MgO in the precursor glass or glass-ceramic composition may be greater than or equal to 10 mol. % to less than or equal to 45 mol. %, greater than or equal to 10 mol. % to less than or equal to 42 mol. %, greater than or equal to 10 mol. % to less than or equal to 40 mol. %, greater than or equal to 10 mol. % to less than or equal to 38 mol. %, greater than or equal to 10 mol. % to less than or equal to 36 mol. %, greater than or equal to 10 mol. % to less than or equal to 34 mol. %, greater than or equal to 10 mol. % to less than or equal to 32 mol. %, greater than or equal to 10 mol. % to less than or equal to 30 mol. %, greater than or equal to 10 mol. % to less than or equal to 28 mol. %, greater than or equal to 10 mol. % to less than or equal to 26 mol. %, greater than or equal to 10 mol. % to less than or equal to 24 mol. %, greater than or equal to 10 mol. % to less than or equal to 22 mol. %, greater than or equal to 10 mol. % to less than or equal to 20 mol. %, greater than or equal to 10 mol. % to less than or equal to 18 mol. %, greater than or equal to 10 mol. % to less than or equal to 16 mol. %, greater than or equal to 10 mol. % to less than or equal to 14 mol. %, greater than or equal to 10 mol. % to less than or equal to 12 mol. %, greater than or equal to 12 mol. % to less than or equal to 45 mol. %, greater than or equal to 14 mol. % to less than or equal to 45 mol. %, greater than or equal to 16 mol. % to less than or equal to 45 mol. %, greater than or equal to 18 mol. % to less than or equal to 45 mol. %, greater than or equal to 20 mol. % to less than or equal to 45 mol. %, greater than or equal to 22 mol. % to less than or equal to 45 mol. %, greater than or equal to 24 mol. % to less than or equal to 45 mol. %, greater than or equal to 26 mol. % to less than or equal to 45 mol. %, greater than or equal to 28 mol. % to less than or equal to 45 mol. %, greater than or equal to 30 mol. % to less than or equal to 45 mol. %, greater than or equal to 32 mol. % to less than or equal to 45 mol. %, greater than or equal to 34 mol. % to less than or equal to 45 mol. %, greater than or equal to 36 mol. % to less than or equal to 45 mol. %, greater than or equal to 38 mol. % to less than or equal to 45 mol. %, greater than or equal to 40 mol. % to less than or equal to 45 mol. %, greater than or equal to 42 mol. % to less than or equal to 45 mol. %, or any and all sub-ranges formed from any of these endpoints. In embodiments, the concentration of MgO in the precursor glass or glass-ceramic composition may be greater than or equal to 10 mol. %, 20 mol. %, 25 mol. % or 30 mol. %. In embodiments, the concentration of MgO may be less than or equal to 45 mol. %, 40 mol. %, 35 mol. %, or 30 mol. %.

In embodiments, the precursor glass or glass-ceramic composition may comprise Na$_2$O. Additions of Na$_2$O may lower the liquidus viscosity of the glass which, in turn, may aid in forming or shaping the precursor glass. Na$_2$O may also facilitate ion-exchange strengthening of the resultant glass-ceramic as most of the Na$_2$O present in the precursor glass is partitioned into the residual glass phase following heat treatment (i.e., ceramming). In embodiments, the concentration of Na$_2$O in the precursor glass or glass-ceramic composition may be greater than or equal to 0 mol. % to less than or equal to 15 mol. %, greater than or equal to 0 mol. % to less than or equal to 13 mol. %, greater than or equal to 0 mol. % to less than or equal to 11 mol. %, greater than or equal to 0 mol. % to less than or equal to 9 mol. %, greater than or equal to 0 mol. % to less than or equal to 7 mol. %, greater than or equal to 0 mol. % to less than or equal to 5 mol. %, greater than or equal to 0 mol. % to less than or equal to 3 mol. %, greater than or equal to 0 mol. % to less than or equal to 1 mol. %, greater than or equal to 1 mol. % to less than or equal to 15 mol. %, greater than or equal to 1 mol. % to less than or equal to 13 mol. %, greater than or equal to 1 mol. % to less than or equal to 11 mol. %, greater than or equal to 1 mol. % to less than or equal to 9 mol. %, greater than or equal to 1 mol. % to less than or equal to 7 mol. %, greater than or equal to 1 mol. % to less than or equal to 5 mol. %, greater than or equal to 1 mol. % to less than or equal to 3 mol. %, greater than or equal to 2 mol. % to less than or equal to 15 mol. %, greater than or equal to 2 mol. % to less than or equal to 13 mol. %, greater than or equal to 2 mol. % to less than or equal to 11 mol. %, greater than or equal to 2 mol. % to less than or equal to 9 mol. %, greater than or equal to 2 mol. % to less than or equal to 7 mol. %, greater than or equal to 2 mol. % to less than or equal to 5 mol. %, greater than or equal to 2 mol. % to less than or equal to 3 mol. %, greater than or equal to 3 mol. % to less than or equal to 15 mol. %, greater than or equal to 4 mol. % to less than or equal to 15 mol. %, greater than or equal to 5 mol. % to less than or equal to 15 mol. %, greater than or equal to 6 mol. % to less than or equal to 15 mol. %, greater than or equal to 7 mol. % to less than or equal to 15 mol. %, greater than or equal to 8 mol. % to less than or equal to 15 mol. %, greater than or equal to 9 mol. % to less than or equal to 15 mol. %, greater than or equal to 10 mol. % to less than or equal to 15 mol. %, greater than or equal to 11 mol. % to less than or equal to 15 mol. %, greater than or equal to 12 mol. % to less than or equal to 15 mol. %, greater than or equal to 13 mol. % to less than or equal to 15 mol. %, greater than or equal to 14 mol. % to less than or equal to 15 mol. %, or any and all sub-ranges formed from any of these endpoints. In embodiments, the concentration of Na$_2$O in the precursor glass or glass-ceramic composition may be greater than or equal to 0 mol. %, 5 mol. % or 10 mol. %. In embodiments, the concentration of Na$_2$O may be less than or equal to 15 mol. %, 10 mol. %, or 5 mol. %. In embodiments, the precursor glass or glass-ceramic composition may be substantially free of Na$_2$O.

In embodiments, the precursor glass or glass-ceramic composition may comprise K$_2$O. Additions of K$_2$O may lower the liquidus viscosity of the glass which, in turn, may aid in forming or shaping the precursor glass. K$_2$O may also facilitate ion-exchange strengthening of the resultant glass-ceramic as most of the K$_2$O is partitioned into the glass phase after ceramming. In embodiments, the concentration of K$_2$O in the precursor glass or glass-ceramic composition may be greater than or equal to 0 mol. % to less than or equal to 15 mol. %, greater than or equal to 0 mol. % to less than or equal to 13 mol. %, greater than or equal to 0 mol. % to less than or equal to 11 mol. %, greater than or equal to 0 mol. % to less than or equal to 9 mol. %, greater than or equal to 0 mol. % to less than or equal to 7 mol. %, greater than or equal to 0 mol. % to less than or equal to 5 mol. %, greater than or equal to 0 mol. % to less than or equal to 3 mol. %, greater than or equal to 0 mol. % to less than or equal to 1 mol. %, greater than or equal to 1 mol. % to less than or equal to 15 mol. %, greater than or equal to 1 mol. % to less than or equal to 13 mol. %, greater than or equal to 1 mol. % to less than or equal to 11 mol. %, greater than or equal to 1 mol. % to less than or equal to 9 mol. %, greater than or equal to 1 mol. % to less than or equal to 7 mol. %, greater than or equal to 1 mol. % to less than or equal to 5 mol. %, greater than or equal to 1 mol. % to less than or equal to 3 mol. %, greater than or equal to 2 mol. % to less than or equal to 15 mol. %, greater than or equal to 2 mol. % to less than or equal to 13 mol. %, greater than or equal to 2 mol. % to less than or equal to 11 mol. %, greater than or equal to 2 mol. % to less than or equal to 9 mol. %, greater than or equal to 2 mol. % to less than or equal to 7 mol. %, greater than or equal to 2 mol. % to less than or equal to 5 mol. %, greater than or equal to 2 mol. % to less than or equal to 3 mol. %, greater than or equal to 3 mol. % to less than or equal to 15 mol. %, greater than or equal to 4 mol. % to less than or equal to 15 mol. %, greater than or equal to 5 mol. % to less than or equal to 15 mol. %, greater than or equal to 5 mol. % to less than or equal to 15 mol. %, greater than or equal to 6 mol. % to less than or equal to 15 mol. %, greater than or equal to 7 mol. % to less than or equal to 15 mol. %, greater than or equal to 8 mol. % to less than or equal to 15 mol. %, greater than or equal to 9 mol. % to less than or equal to 15 mol. %, greater than or equal to 10 mol. % to less than or equal to 15 mol. %, greater than or equal to 11 mol. % to less than or equal to 15 mol. %, greater than or equal to 12 mol. % to less than or equal to 15 mol. %, greater than or equal to 13 mol. % to less than or equal to 15 mol. %, or any and all sub-ranges formed from any of these endpoints. In embodiments, the concentration of $K_2O$ in the precursor glass or glass-ceramic composition may be greater than or equal to 0 mol. %, 5 mol. % or 10 mol. %. In embodiments, the concentration of $K_2O$ may be less than or equal to 15 mol. %, 10 mol. %, or 5 mol. %. In embodiments, the precursor glass or glass-ceramic composition may be substantially free of $K_2O$.

In embodiments, $Na_2O$ (mol. %)+$K_2O$ (mol. %) in the precursor glass or glass-ceramic compositions described herein may be greater than or equal to 0 mol. % and less than or equal to 15 mol. %. In embodiments, $Na_2O$ (mol. %)+$K_2O$ (mol. %) in the precursor glass or glass-ceramic compositions described herein may be greater than or equal to 0 mol. % to less than or equal to 15 mol. %, greater than or equal to 0 mol. % to less than or equal to 13 mol. %, greater than or equal to 0 mol. % to less than or equal to 11 mol. %, greater than or equal to 0 mol. % to less than or equal to 9 mol. %, greater than or equal to 0 mol. % to less than or equal to 7 mol. %, greater than or equal to 0 mol. % to less than or equal to 5 mol. %, greater than or equal to 1 mol. % to less than or equal to 15 mol. %, greater than or equal to 1 mol. % to less than or equal to 13 mol. %, greater than or equal to 1 mol. % to less than or equal to 11 mol. %, greater than or equal to 1 mol. % to less than or equal to 9 mol. %, greater than or equal to 1 mol. % to less than or equal to 7 mol. %, greater than or equal to 1 mol. % to less than or equal to 5 mol. %, greater than or equal to 2 mol. % to less than or equal to 15 mol. %, greater than or equal to 2 mol. % to less than or equal to 13 mol. %, greater than or equal to 2 mol. % to less than or equal to 11 mol. %, greater than or equal to 2 mol. % to less than or equal to 9 mol. %, greater than or equal to 2 mol. % to less than or equal to 7 mol. %, greater than or equal to 2 mol. % to less than or equal to 5 mol. %, greater than or equal to 3 mol. % to less than or equal to 15 mol. %, greater than or equal to 3 mol. % to less than or equal to 13 mol. %, greater than or equal to 3 mol. % to less than or equal to 11 mol. %, greater than or equal to 3 mol. % to less than or equal to 9 mol. %, greater than or equal to 3 mol. % to less than or equal to 7 mol. %, greater than or equal to 3 mol. % to less than or equal to 5 mol. %, greater than or equal to 4 mol. % to less than or equal to 15 mol. %, greater than or equal to 4 mol. % to less than or equal to 13 mol. %, greater than or equal to 4 mol. % to less than or equal to 11 mol. %, greater than or equal to 4 mol. % to less than or equal to 9 mol. %, greater than or equal to 4 mol. % to less than or equal to 7 mol. %, greater than or equal to 4 mol. % to less than or equal to 5 mol. %, greater than or equal to 5 mol. % to less than or equal to 15 mol. %, greater than or equal to 5 mol. % to less than or equal to 13 mol. %, greater than or equal to 5 mol. % to less than or equal to 11 mol. %, greater than or equal to 5 mol. % to less than or equal to 9 mol. %, greater than or equal to 5 mol. % to less than or equal to 7 mol. %, greater than or equal to 6 mol. % to less than or equal to 15 mol. %, greater than or equal to 6 mol. % to less than or equal to 13 mol. %, greater than or equal to 6 mol. % to less than or equal to 11 mol. %, greater than or equal to 6 mol. % to less than or equal to 9 mol. %, greater than or equal to 6 mol. % to less than or equal to 7 mol. %, greater than or equal to 7 mol. % to less than or equal to 15, mol. %, greater than or equal to 7 mol. % to less than or equal to 13 mol. %, greater than or equal to 7 mol. % to less than or equal to 11 mol. %, greater than or equal to 7 mol. % to less than or equal to 9 mol. %, greater than or equal to 8 mol. % to less than or equal to 15 mol. %, greater than or equal to 8 mol. % to less than or equal to 13 mol. %, greater than or equal to 8 mol. % to less than or equal to 11 mol. %, greater than or equal to 8 mol. % to less than or equal to 9 mol. %, greater than or equal to 9 mol. % to less than or equal to 15 mol. %, greater than or equal to 9 mol. % to less than or equal to 13 mol. %, greater than or equal to 9 mol. % to less than or equal to 11 mol. %, greater than or equal to 10 mol. % to less than or equal to 15 mol. %, greater than or equal to 10 mol. % to less than or equal to 13 mol. %, greater than or equal to 10 mol. % to less than or equal to 11 mol. %, greater than or equal to 11 mol. % to less than or equal to 15 mol. %, greater than or equal to 11 mol. % to less than or equal to 13 mol. %, greater than or equal to 13 mol. % to less than or equal to 15 mol. %, or any and all sub-ranges formed from any of these endpoints. In embodiments, the concentration of $Na_2O$ (mol. %)+$K_2O$ (mol. %) in the precursor glass or glass-ceramic composition may be greater than or equal to 2 mol. %, 3 mol. %, 5 mol. % or 10 mol. %. In embodiments, the concentration of $Na_2O$ (mol. %)+$K_2O$ (mol. %) may be less than or equal to 15 mol. %, 10 mol. %, or 5 mol. %. In embodiments, $Na_2O$ (mol. %)/($Na_2O$ (mol. %)+$K_2O$ (mol. %)) may be greater than or equal to 0.3 to improve the ion-exchange-ability of the resultant glass-ceramic. Without wishing to be bound by theory, it is believed that when $Na_2O$ (mol. %)/($Na_2O$ (mol. %)+$K_2O$ (mol. %)) is less than 0.3, strengthening of the resultant glass-ceramic by ion exchange may be difficult.

In embodiments, the precursor glass or glass-ceramic composition may comprise $ZrO_2$. Without wishing to be bound by theory, it is believed that $ZrO_2$ acts as a nucleating agent that facilitates the nucleation of the crystalline phase having the jeffbenite crystalline structure during heat treatment at ambient atmospheric pressure (i.e., ~100 kPa). In embodiments, the $ZrO_2$ may be tetragonal $ZrO_2$. In embodiments, the concentration of $ZrO_2$ in the precursor glass or glass-ceramic composition may be greater than or equal to 0 mol. % to less than or equal to 7 mol. % $ZrO_2$, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 7 mol. %, greater than or equal to 5 mol. % to less than or equal to 6 mol. %, greater than or equal to 6 mol. % to less than or equal to 7 mol. %, or any and all sub-ranges formed from any of these endpoints. In embodiments, the concentration of $ZrO_2$ in the precursor glass or glass-ceramic composition may be greater than or equal to 2 mol. %, 3 mol. % or 4 mol. %. In embodiments, the concentration of $ZrO_2$ may be less than or equal to 7 mol. %, 6 mol. %, or 5 mol. %. In embodiments, the precursor glass or glass-ceramic composition may be substantially free of $ZrO_2$.

In embodiments, the precursor glass or glass-ceramic composition may comprise $TiO_2$. Without wishing to be bound by theory, it is believed that $TiO_2$ acts as a nucleating agent that facilitates the formation of crystalline phases during heat treatment. Increasing concentrations of $TiO_2$ may also impart color to the precursor glass and resultant glass-ceramic. In embodiments, the concentration of $TiO_2$ in the precursor glass or glass-ceramic composition may be greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 0.3 mol. % to less than or equal to 7 mol. %, greater than or equal to 0.3 mol. % to less than or equal to 6 mol. %, greater than or equal to 0.3 mol. % to less than or equal to 5 mol. %, greater than or equal to 0.3 mol. % to less than or equal to 4 mol. %, greater than or equal to 0.3 mol. % to less than or equal to 3 mol. %, greater than or equal to 0.3 mol. % to less than or equal to 2 mol. %, greater than or equal to 0.3 mol. % to less than or equal to 1 mol. %, greater than or equal to 0.5 mol. % to less than or equal to 7 mol. %, greater than or equal to 0.5 mol. % to less than or equal to 6 mol. %, greater than or equal to 0.5 mol. % to less than or equal to 5 mol. %, greater than or equal to 0.5 mol. % to less than or equal to 4 mol. %, greater than or equal to 0.5 mol. % to less than or equal to 3 mol. %, greater than or equal to 0.5 mol. % to less than or equal to 2 mol. %, greater than or equal to 0.5 mol. % to less than or equal to 1 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 7 mol. %, greater than or equal to 5 mol. % to less than or equal to 6 mol. %, greater than or equal to 6 mol. % to less than or equal to 7 mol. %, or any and all sub-ranges formed from any of these endpoints. In embodiments, the concentration of $TiO_2$ in the precursor glass or glass-ceramic composition may be greater than or equal to 0 mol. %, 1 mol. %, or 2 mol. %. In embodiments, the concentration of $TiO_2$ may be less than or equal to 7 mol. %, 6 mol. %, or 5 mol. %. In embodiments, the precursor glass or glass-ceramic composition may be substantially free of $TiO_2$.

In embodiments, $ZrO_2$ (mol. %)+$TiO_2$ (mol. %) in the precursor glass or glass-ceramic compositions described herein may be greater than or equal to 2.0 mol. %, greater than or equal to 3.0 mol. %, or even greater than or equal to 4.0 mol. %. In embodiments, $ZrO_2$ (mol. %)/($ZrO_2$ (mol. %)+$TiO_2$ (mol. %)) in the precursor glass or glass-ceramic compositions described herein may be greater than or equal to 0.3. Without intending to be bound by theory, when $ZrO_2$ (mol. %)/($ZrO_2$ (mol. %)+$TiO_2$ (mol. %)) in the precursor glass or glass-ceramic compositions is less than 0.3 then the primary crystalline phase in the glass-ceramic may be a forsterite crystalline phase instead of a crystalline phase having a jeffbenite crystalline structure, which may be undesirable.

In embodiments, the precursor glass or glass-ceramic composition may comprise $SnO_2$. $SnO_2$ primarily functions as a fining agent in the precursor glass composition. However, additions of $SnO_2$ may also aid the nucleating agents (such as $TiO_2$ and $ZrO_2$) in nucleating crystalline phases during heat treatment. In embodiments, the concentration of $SnO_2$ in the precursor glass or glass-ceramic composition may be greater than or equal to 0 mol. % to less than or equal to 0.2 mol. %, greater than or equal to 0 mol. % to less than or equal to 0.18 mol. %, greater than or equal to 0 mol. % to less than or equal to 0.16 mol. %, greater than or equal to 0 mol. % to less than or equal to 0.14 mol. %, greater than or equal to mol. % to less than or equal to 0.12 mol. %, greater than or equal to 0 mol. % to less than or equal to 0.11 mol. %, greater than or equal to 0 mol. % to less than or equal to 0.1 mol. %, greater than or equal to 0.08 mol. % to less than or equal to 0.2 mol. %, greater than or equal to 0.09 mol. % to less than or equal to 0.2 mol. %, greater than or equal to 0.1 mol. % to less than or equal to 0.2 mol. %, greater than or equal to 0.12 mol. % to less than or equal to 0.2 mol. %, greater than or equal to 0.13 mol. % to less than or equal to 0.2 mol. %, greater than or equal to 0.14 mol. % to less than or equal to 0.2 mol. %, or any and all sub-ranges formed from any of these endpoints. In embodiments, the concentration of $SnO_2$ in the precursor glass or glass-ceramic composition may be greater than or equal to 0 mol. %, 0.08 mol. %, or 0.09 mol. %. In embodiments, the concentration of $SnO_2$ may be less than or equal to 0.2 mol. %, 0.18 mol. %, or 0.16 mol. %. In embodiments, the precursor glass or glass-ceramic composition may be substantially free of $SnO_2$.

In embodiments, the precursor glass or glass-ceramic composition may comprise BaO. BaO may increase the refractive index of the residual glass of the glass-ceramic to better match the refractive index of the crystalline phase having the jeffbenite crystalline structure in the glass-ceramic. In embodiments, the concentration of BaO in the precursor glass or glass-ceramic composition may be greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 8 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 8 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 8 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. % to less than or equal to 4 mol. %, greater than or equal to 4 mol. % to less than or equal to 8 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 8 mol. %, greater than or equal to 5 mol. % to less than or equal to 7 mol. %, greater than or equal to 5 mol. % to less than or equal to 6 mol. %, greater than or equal to 6 mol. % to less than or equal to 8 mol. %, greater than or equal to 6 mol. % to less than or equal to 7 mol. %, greater than or equal to 7 mol. % to less than or equal to 8 mol. % or any and all sub-ranges formed from any of these endpoints. In embodiments, the precursor glass or glass-ceramic composition may be substantially free of BaO.

In embodiments, the precursor glass or glass-ceramic composition may comprise ZnO. Additions of ZnO may increase the refractive index of the residual glass in the glass-ceramic to better match the refractive index of the crystalline phase having the jeffbenite crystalline structure in the glass-ceramic. While not wishing to be bound by theory, it is believed that additions of ZnO may result in the replacement of at least a portion of the Mg in the jeffbenite crystalline structure with Zn. ZnO may also help stabilize the precursor glass, prevent devitrification, and lower the liquidus viscosity. However, too much ZnO may disrupt the formation of the crystalline phase having the jeffbenite crystalline structure during ceramming. In embodiments, the concentration of ZnO in the precursor glass or glass-ceramic composition may be greater than or equal to 0 mol. % to less than or equal to 12 mol. %, greater than or equal to 0 mol. % to less than or equal to 11 mol. %, greater than or equal to 0 mol. % to less than or equal to 10 mol. %, greater than or equal to 0 mol. % to less than or equal to 9 mol. %, greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 12 mol. %, greater than or equal to 1 mol. % to less than or equal to 11 mol. %, greater than or equal to 1 mol. % to less than or equal to 10 mol. %, greater than or equal to 1 mol. % to less than or equal to 9 mol. %, greater than or equal to 1 mol. % to less than or equal to 8 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 12 mol. %, greater than or equal to 2 mol. % to less than or equal to 11 mol. %, greater than or equal to 2 mol. % to less than or equal to 10 mol. %, greater than or equal to 2 mol. % to less than or equal to 9 mol. %, greater than or equal to 2 mol. % to less than or equal to 8 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 12 mol. %, greater than or equal to 3 mol. % to less than or equal to 11 mol. %, greater than or equal to 3 mol. % to less than or equal to 10 mol. %, greater than or equal to 3 mol. % to less than or equal to 9 mol. %, greater than or equal to 3 mol. % to less than or equal to 8 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 12 mol. %, greater than or equal to 4 mol. % to less than or equal to 11 mol. %, greater than or equal to 4 mol. % to less than or equal to 10 mol. %, greater than or equal to 4 mol. % to less than or equal to 9 mol. %, greater than or equal to 4 mol. % to less than or equal to 8 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 12 mol. %, greater than or equal to 5 mol. % to less than or equal to 11 mol. %, greater than or equal to 5 mol. % to less than or equal to 10 mol. %, greater than or equal to 5 mol. % to less than or equal to 9 mol. %, greater than or equal to 5 mol. % to less than or equal to 8 mol. %, greater than or equal to 5 mol. % to less than or equal to 7 mol. %, greater than or equal to 5 mol. % to less than or equal to 6 mol. %, greater than or equal to 6 mol. % to less than or equal to 12 mol. %, greater than or equal to 6 mol. % to less than or equal to 11 mol. %, greater than or equal to 6 mol. % to less than or equal to 10 mol. %, greater than or equal to 6 mol. % to less than or equal to 9 mol. %, greater than or equal to 6 mol. % to less than or equal to 8 mol. %, greater than or equal to 6 mol. % to less than or equal to 7 mol. %, greater than or equal to 7 mol. % to less than or equal to 8 mol. % or any and all sub-ranges formed from any of these endpoints. In embodiments, the precursor glass or glass-ceramic composition may be substantially free of ZnO.

In embodiments, the precursor glass or glass-ceramic composition may comprise FeO. While not wishing to be bound by theory, it is believed that additions of FeO may result in the replacement of at least a portion of the Mg in the jeffbenite crystalline structure with Fe. FeO may also impart color to the precursor glass and glass-ceramic. In embodiments, the concentration of FeO in the precursor glass or glass-ceramic composition may be greater than or equal to 0 mol. % to less than or equal to 9 mol. %, greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 9 mol. %, greater than or equal to 2 mol. % to less than or equal to 9 mol. %, greater than or equal to 3 mol. % to less than or equal to 9 mol. %, greater than or equal to 4 mol. % to less than or equal to 9 mol. %, greater than or equal to 5 mol. % to less than or equal to 9 mol. %, greater than or equal to 6 mol. % to less than or equal to 9 mol. %, greater than or equal to 7 mol. % to less than or equal to 9 mol. %, greater than or equal to 8 mol. % to less than or equal to 9 mol. %, or any and all sub-ranges formed from any of these endpoints. In embodiments, the precursor glass- ceramic composition may be substantially free of FeO.

In embodiments, the precursor glass or glass-ceramic composition may comprise CaO, SrO, or combinations thereof. Additions of CaO, SrO and combinations thereof may increase the amount of residual glass in the glass-ceramic. In embodiments, the concentration of CaO, SrO, or a combination thereof may be greater than or equal to 0 mol. % to less than or equal to 2.0 mol. %, greater than or equal to 0.2 mol. % to less than or equal to 2.0 mol. %, greater than or equal to 0.4 mol. % to less than or equal to 2.0 mol. %, greater than or equal to 0.6 mol. % to less than or equal to 2.0 mol. %, greater than or equal to 0.8 mol. % to less than or equal to 2.0 mol. %, greater than or equal to 1.0 mol. % to less than or equal to 2.0 mol. %, greater than or equal to 1.2 mol. % to less than or equal to 2.0 mol. %, greater than or equal to 1.4 mol. % to less than or equal to 2.0 mol. %, greater than or equal to 0 mol. % to less than or equal to 1.7 mol. %, greater than or equal to 0.2 mol. % to less than or equal to 1.7 mol. %, greater than or equal to 0.4 mol. % to less than or equal to 1.7 mol. %, greater than or equal to 0.6 mol. % to less than or equal to 1.7 mol. %, greater than or equal to 0.8 mol. % to less than or equal to 1.7 mol. %, greater than or equal to 1.0 mol. % to less than or equal to 1.7 mol. %, greater than or equal to 1.2 mol. % to less than or equal to 1.7 mol. %, greater than or equal to 1.4 mol. % to less than or equal to 1.7 mol. %, greater than or equal to 0 mol. % to less than or equal to 1.4 mol. %, greater than or equal to 0 mol. % to less than or equal to 1.2 mol. %, greater than or equal to 0 mol. % to less than or equal to 1.0 mol. %, greater than or equal to 0 mol. % to less than or equal to 0.8 mol. %, greater than or equal to 0 mol. % to less than or equal to 0.6 mol. %, greater than or equal to 0 mol. % to less than or equal to 0.4 mol. %, greater than or equal to 0 mol. % to less than or equal to 0.2 mol. %, or any and all sub-ranges formed from any of these endpoints. In embodiments, the precursor glass or glass-ceramic composition may be substantially free of CaO. In embodiments, the precursor glass or glass-ceramic composition may be substantially free of SrO. In embodiments, the precursor glass or glass-ceramic composition may be substantially free of both CaO and SrO.

In embodiments, the precursor glass or glass-ceramic composition may comprise $Cs_2O$. Without wishing to be bound by theory, it is believed that additions of $Cs_2O$ remain in the residual glass following ceramming and function to raise the index of refraction of the residual glass without causing crystallization. In embodiments, the concentration of $Cs_2O$ in the precursor glass or glass-ceramic composition may be greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 5 mol. %, greater than or equal to 2 mol. % to less than or equal to 5 mol. %, greater than or equal to 3 mol. % to less than or equal to 5 mol. %, greater than or equal to 4 mol. % to less than or equal to 5 mol. %, or any and all sub-ranges formed from any of these endpoints. In embodiments, the precursor glass or glass-ceramic composition may be substantially free of $Cs_2O$.

In embodiments, the precursor glass or glass-ceramic composition may comprise $Li_2O$. For example, without limitation, the precursor glass or glass-ceramic composition may comprise less than or equal to 3 mol. %, less than or equal to 2.5 mol. %, less than or equal to 2 mol. %, less than or equal to 1.5 mol. %, less than or equal to 1 mol. %, less than or equal to 0.7 mol. %, less than or equal to 0.5 mol. %, less than or equal to 0.3 mol. %, or less than or equal to 0.1 mol. % $Li_2O$. In embodiments, the precursor glass or glass-ceramic composition may be substantially free of $Li_2O$. Without intending to be bound by theory, when the precursor glass comprises less than or equal to 3 mol. % $Li_2O$ the formation of beta quartz during heat treatment may be reduced.

In embodiments, the precursor glass or glass-ceramic composition may comprise $Y_2O_3$. Without wishing to be bound by theory, $Y_2O_3$ may stabilize $ZrO_2$ included in the precursor glass or glass-ceramic composition. In embodiments, the concentration of $Y_2O_3$ may be greater than or equal to 0 mol. % to less than or equal to 2.0 mol. %, greater than or equal to 0.2 mol. % to less than or equal to 2.0 mol. %, greater than or equal to 0.4 mol. % to less than or equal to 2.0 mol. %, greater than or equal to 0.6 mol. % to less than or equal to 2.0 mol. %, greater than or equal to 0.8 mol. % to less than or equal to 2.0 mol. %, greater than or equal to 1.0 mol. % to less than or equal to 2.0 mol. %, greater than or equal to 1.2 mol. % to less than or equal to 2.0 mol. %, greater than or equal to 1.4 mol. % to less than or equal to 2.0 mol. %, greater than or equal to 1.6 mol. % to less than or equal to 2.0 mol. %, greater than or equal to 1.8 mol. % to less than or equal to 2.0 mol. %, greater than or equal to 0 mol. % to less than or equal to 1.8 mol. %, greater than or equal to 0 mol. % to less than or equal to 1.6 mol. %, greater than or equal to 0 mol. % to less than or equal to 1.4 mol. %, greater than or equal to 0 mol. % to less than or equal to 1.2 mol. %, greater than or equal to 0 mol. % to less than or equal to 1.0 mol. %, greater than or equal to 0 mol. % to less than or equal to 0.8 mol. %, greater than or equal to 0 mol. % to less than or equal to 0.6 mol. %, greater than or equal to 0 mol. % to less than or equal to 0.4 mol. %, greater than or equal to 0 mol. % to less than or equal to 0.2 mol. %, or any and all sub-ranges formed from any of these endpoints. In embodiments, the precursor glass or glass-ceramic composition may be substantially free of $Y_2O_3$.

In embodiments, the precursor glass or glass-ceramic composition may be substantially free from $P_2O_5$. In some embodiments, the precursor glass or glass-ceramic composition may be free from $P_2O_5$. Without wishing to be bound by theory, inclusion of $P_2O_5$ in the precursor glass or glass-ceramic composition may result in the formation of magnesium phosphate and reduced formation of the crystalline phase having the jeffbenite crystalline structure.

In embodiments, the precursor glass or glass-ceramic composition may comprise $MnO_2$. While not wishing to be bound by theory, it is believed that additions of $MnO_2$ may result in the replacement of at least a portion of the Mg in the jeffbenite crystalline structure with Mn. $MnO_2$ may also impart color to the precursor glass and glass-ceramic. In embodiments, the concentration of $MnO_2$ may be greater than or equal to 0 mol. % to less than or equal to 1.0 mol. %, greater than or equal to 0.1 mol. % to less than or equal to 1 mol. %, greater than or equal to 0.2 mol. % to less than or equal to 1.0 mol. %, greater than or equal to 0.4 mol. % to less than or equal to 1.0 mol. %, greater than or equal to 0.6 mol. % to less than or equal to 1.0 mol. %, greater than or equal to 0.8 mol. % to less than or equal to 1.0 mol. %, greater than or equal to 0 mol. % to less than or equal to 0.8 mol. %, greater than or equal to 0 mol. % to less than or equal to 0.6 mol. %, greater than or equal to 0 mol. % to less than or equal to 0.4 mol. %, greater than or equal to 0 mol. % to less than or equal to 0.2 mol. %, or any and all sub-ranges formed from any of these endpoints. In embodiments, the precursor glass or glass-ceramic composition may be substantially free of $MnO_2$.

The articles formed from the precursor glass or glass-ceramics described herein may be any suitable thickness depending on the particular application of the glass-ceramic. Glass-ceramic sheet embodiments may have a thickness T of from greater than or equal to 0.2 mm to less than or equal to 10 mm. In embodiments, the glass-ceramic sheet embodiments may have a thickness T of 6 mm or less, 5 mm or less, 4 mm or less, 3 mm or less, 2 mm or less, 1.0 mm or less, 750 μm or less, 500 μm or less, or 250 μm or less. In embodiments, the glass-ceramic sheet embodiments may have a thickness T of from greater than or equal to 200 μm to less than or equal to 5 mm, greater than or equal to 500 μm to less than or equal to 5 mm, greater than or equal to 200 μm to less than or equal to 4 mm, greater than or equal to 200 μm to less than or equal to 2 mm, greater than or equal to 400 μm to less than or equal to 5 mm, or greater than or equal to 400 μm to less than or equal to 2 mm. It should be understood that the thickness of the precursor glass or glass-ceramic article may be within a sub-range formed from any and all of the foregoing endpoints.

In embodiments, the precursor glass or glass-ceramic compositions described herein are ion exchangeable to facilitate strengthening the precursor glass or glass-ceramic. In typical ion exchange processes, smaller metal ions in the glass-ceramic are replaced or "exchanged" with larger metal ions of the same valence within a layer that is close to the outer surface of the glass-ceramic. The replacement of smaller ions with larger ions creates a compressive stress within the layer of the glass-ceramic. In embodiments, the metal ions are monovalent metal ions (e.g., $Li^+$, $Na^+$, $K^+$, and the like), and ion exchange is accomplished by immersing the glass-ceramic in a bath comprising at least one molten salt of the larger metal ion that is to replace the smaller metal ion in the glass-ceramic. The ion exchange process or processes that are used to strengthen the glass-ceramic may include, but are not limited to, immersion in a single bath or multiple baths of like or different compositions with washing and/or annealing steps between immersions. In embodiments, the glass-ceramics may be ion exchanged by exposure to molten $KNO_3$ salt, molten $NaNO_3$ salt, or a mixture of molten salts comprising $KNO_3$ and $NaNO_3$. If $Na_2O$ is present in the precursor glass or glass-ceramic, $Na^+$ for $K^+$ ion exchange may occur in a $KNO_3$ salt bath or a salt bath comprising $KNO_3$ in combination with $NaNO_3$. If $Li_2O$ is present in the precursor glass or glass-ceramic, $Na^+$ for $Li^+$ ion exchange may occur in a $NaNO_3$ salt bath or a salt bath comprising $NaNO_3$ in combination with $KNO_3$. In embodiments, the glass-ceramics may be ion exchanged in a molten salt bath at a bath temperature of from greater than or equal to 350° C. to less than or equal to 500° C. For example, without limitation, the glass-ceramics may be ion exchanged at a bath temperature of greater than or equal to 350° C. to less than or equal to 500° C., greater than or equal to 375° C. to less than or equal to 500° C., greater than or equal to 400° C. to less than or equal to 500° C., greater than or equal to 425° C. to less than or equal to 500° C., greater than or equal to 450° C. to less than or equal to 500° C., greater than or equal to 475° C. to less than or equal to 500° C., greater than or equal to 350° C. to less than or equal to 475° C., greater than or equal to 350° C. to less than or equal to 450° C., greater than or equal to 350° C. to less than or equal to 425° C., greater than or equal to 350° C. to less than or equal to 400° C., greater than or equal to 350° C. to less than or equal to 375° C., or any and all sub-ranges formed from any of these endpoints. The ion exchange time may be from greater than or equal to 1 hour to less than or equal to 48 hours. In embodiments, the ion exchange process may develop a surface compressive layer in the glass precursors or glass-ceramic compositions. The development of this surface compression layer is beneficial for achieving a better crack resistance and higher flexural strength compared to non-ion-exchanged materials. The surface compression layer has a higher concentration of the ions exchanged into the glass-ceramic article in comparison to the concentration of the ions exchanged into the glass-ceramic article for the body (i.e., the area not including the surface compression) of the glass-ceramic article.

In embodiments, the precursor glass and/or glass-ceramics may be ion exchanged to achieve a depth of compression of about 30 μm or greater, about 40 μm or greater, about 50 μm or greater, about 60 μm or greater, about 70 μm or greater, about 80 μm or greater, about 90 μm or greater, or about 100 μm or greater. In embodiments, the depth of compression may be greater than or equal to 3% of the thickness of the article formed from the precursor glass and/or the glass-ceramics, greater than or equal to 5% of the thickness, greater than or equal to 10% of the thickness, greater than or equal to 15% of the thickness, greater than or equal to 20% of the thickness, or even greater than or equal to 22% of the thickness. The development of this surface compression layer is beneficial for achieving a better crack resistance and higher flexural strength compared to non-ion-exchanged materials. The surface compression layer has a higher concentration of the ion exchanged into the precursor glass and/or glass-ceramic article in comparison to the concentration of the ion exchanged into the article for the body (i.e., area not including the surface compression) of the article.

In embodiments, the precursor glass and/or glass-ceramics are ion exchanged to achieve a central tension greater than or equal to 10 MPa. In embodiments, the central tension may be greater than or equal to 10 MPa and less than or equal to 200 MPa, greater than or equal to 20 MPa and less than or equal to 200 MPa, greater than or equal to 30 MPa and less than or equal to 200 MPa, greater than or equal to 40 MPa and less than or equal to 200 MPa, greater than or equal to 50 MPa and less than or equal to 200 MPa, greater than or equal to 60 MPa and less than or equal to 200 MPa, greater than or equal to 70 MPa and less than or equal to 200 MPa, greater than or equal to 80 MPa and less than or equal to 200 MPa, greater than or equal to 90 MPa and less than or equal to 200 MPa, greater than or equal to 100 MPa and less than or equal to 200 MPa, greater than or equal to 110 MPa and less than or equal to 200 MPa, greater than or equal to 120 MPa and less than or equal to 200 MPa, greater than or equal to 130 MPa and less than or equal to 200 MPa, greater than or equal to 140 MPa and less than or equal to 200 MPa, greater than or equal to 150 MPa and less than or equal to 200 MPa, greater than or equal to 160 MPa and less than or equal to 200 MPa, greater than or equal to 170 MPa and less than or equal to 200 MPa, greater than or equal to 180 MPa and less than or equal to 200 MPa, greater than or equal to 190 MPa and less than or equal to 200 MPa, or any and all sub-ranges formed from any of these endpoints.

In embodiments, the precursor glass or glass-ceramic can have a surface compressive stress in a range from greater than or equal to 100 MPa to less than or equal to 1 GPa, greater than or equal to 100 MPa to less than or equal to 950 MPa, greater than or equal to 100 MPa to less than or equal to 900 MPa, greater than or equal to 100 MPa to less than or equal to 850 MPa, greater than or equal to 100 MPa to less than or equal to 800 MPa, greater than or equal to 100 MPa to less than or equal to 750 MPa, greater than or equal to 100 MPa to less than or equal to 700 MPa, greater than or equal to 100 MPa to less than or equal to 650 MPa, greater than or equal to 100 MPa to less than or equal to 600 MPa, greater than or equal to 100 MPa to less than or equal to 550 MPa, greater than or equal to 100 MPa to less than or equal to 500 MPa, greater than or equal to 100 MPa to less than or equal to 450 MPa, greater than or equal to 100 MPa to less than or equal to 400 MPa, greater than or equal to 100 MPa to less than or equal to 350 MPa, greater than or equal to 100 MPa to less than or equal to 300 MPa, greater than or equal to 100 MPa to less than or equal to 250 MPa, greater than or equal to 100 MPa to less than or equal to 200 MPa, greater than or equal to 100 MPa to less than or equal to 150 MPa, 150 MPa to less than or equal to 500 MPa, greater than or equal to 150 MPa to less than or equal to 450 MPa, greater than or equal to 150 MPa to less than or equal to 400 MPa, greater than or equal to 150 MPa to less than or equal to 350 MPa, greater than or equal to 150 MPa to less than or equal to 300 MPa, greater than or equal to 150 MPa to less than or equal to 250 MPa, greater than or equal to 150 MPa to less than or equal to 200 MPa, 200 MPa to less than or equal to 500 MPa, greater than or equal to 200 MPa to less than or equal to 450 MPa, greater than or equal to 200 MPa to less than or equal to 400 MPa, greater than or equal to 200 MPa to less than or equal to 350 MPa, greater than or equal to 200 MPa to less than or equal to 300 MPa, greater than or equal to 200 MPa to less than or equal to 250 MPa, 250 MPa to less than or equal to 500 MPa, greater than or equal to 250 MPa to less than or equal to 450 MPa, greater than or equal to 250 MPa to less than or equal to 400 MPa, greater than or equal to 250 MPa to less than or equal to 350 MPa, greater than or equal to 250 MPa to less than or equal to 300 MPa, 300 MPa to less than or equal to 500 MPa, greater than or equal to 300 MPa to less than or equal to 450 MPa, greater than or equal to 300 MPa to less than or equal to 400 MPa, greater than or equal to 300 MPa to less than or equal to 350 MPa, 350 MPa to less than or equal to 500 MPa, greater than or equal to 350 MPa to less than or equal to 450 MPa, greater than or equal to 350 MPa to less than or equal to 400 MPa, 400 MPa to less than or equal to 500 MPa, greater than or equal to 400 MPa to less than or equal to 450 MPa, greater than or equal to 450 MPa to less than or equal to 500 MPa or any and all sub-ranges formed from any of these endpoints. In embodiments, the precursor glass or glass-ceramic can have a surface compressive stress of about 100 MPa or greater, about 150 MPa or greater, about 200 MPa or greater, about 250 MPa or greater, about 300 MPa or greater, about 350 MPa or greater, about 400 MPa or greater, about 450 MPa or greater, or about 500 MPa or greater.

In embodiments, the process for making the glass-ceramic includes melting a batch of constituent components to form the precursor glass. The molten precursor glass may be poured into a mold. In embodiments, the mold may comprise steel. The precursor glass may be annealed. Pucks of the precursor glass may be sectioned and then heat treated to form the glass-ceramic.

Alternatively, the precursor glasses described herein can be manufactured from molten precursor glass and formed into sheets via processes, including but not limited to, slot draw, float, rolling, and other sheet-forming processes known in the art.

In embodiments, the processes for making the glass-ceramic includes heat treating (also referred to herein as "ceramming") the precursor glass at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). The one or more preselected temperatures may be less than 1500 K throughout the heat treating process. Without wishing to be bound by theory, the nucleating agents may function as or form nucleation sites at which nucleation and growth of grains of the crystalline phases occur, including nucleation and growth of grains of the crystalline phases having the jeffbenite crystalline structure. The nucleation sites are positioned and oriented within the precursor glass such that grains of the resultant crystalline phases, including grains of the crystalline phases having the jeffbenite crystalline structure, are homogenously distributed throughout the resultant glass-ceramic and grow in random orientations, resulting in a glass-ceramic with isotropic material properties. In embodiments, the heat treatment may include heating the precursor glass in a heat treatment furnace at a rate of 1-10° C./min until the furnace reaches a first temperature. The first temperature of the furnace may be from greater than or equal to 700° C. to less than or equal to 950° C. In embodiments, the first temperature of the furnace may be greater than or equal to 700° C. to less than or equal to 950° C., greater than or equal to 710° C. to less than or equal to 950° C., greater than or equal to 730° C. to less than or equal to 950° C., greater than or equal to 750° C. to less than or equal to 950° C., greater than or equal to 770° C. to less than or equal to 950° C., greater than or equal to 790° C. to less than or equal to 950° C., greater than or equal to 810° C. to less than or equal to 950° C., greater than or equal to 830° C. to less than or equal to 950° C., greater than or equal to 850° C. to less than or equal to 950° C., greater than or equal to 870° C. to less than or equal to 950° C., greater than or equal to 890° C. to less than or equal to 950° C., greater than or equal to 910° C. to less than or equal to 950° C., greater than or equal to 930° C. to less than or equal to 950° C., greater than or equal to 700° C. to less than or equal to 930° C., greater than or equal to 700° C. to less than or equal to 910° C., greater than or equal to 700° C. to less than or equal to 890° C., greater than or equal to 700° C. to less than or equal to 870° C., greater than or equal to 700° C. to less than or equal to 850° C., greater than or equal to 700° C. to less than or equal to 830° C., greater than or equal to 700° C. to less than or equal to 810° C., greater than or equal to 700° C. to less than or equal to 790° C., greater than or equal to 700° C. to less than or equal to 770° C., greater than or equal to 700° C. to less than or equal to 750° C., greater than or equal to 700° C. to less than or equal to 730° C., greater than or equal to 700° C. to less than or equal to 710° C., or any and all sub-ranges formed from any of these endpoints. Unless otherwise indicated, the temperature of a heat treatment or ion exchange treatment refers to the temperature of the environment to which the article is exposed (such as the furnace for a heat treatment or the molten salt bath for an ion exchange treatment). In embodiments, the processes for making the glass-ceramic includes maintaining the precursor glass at the first temperature for a first time in a range from 0.25 hours to 6 hours. For example, without limitation, the precursor glass may be maintained at the first temperature for a first time in a range from greater than or equal to 0.25 hours to less than or equal to 6 hours, greater than or equal to 0.5 hours to less than or equal to 6 hours, greater than or equal to 0.75 hours to less than or equal to 6 hours, greater than or equal to 1 hour to less than or equal to 6 hours, greater than or equal to 1.25 hours to less than or equal to 6 hours, greater than or equal to 1.5 hours to less than or equal to 6 hours, greater than or equal to 1.75 hours to less than or equal to 6 hours, greater than or equal to 2 hours to less than or equal to 6 hours, greater than or equal to 2.25 hours to less than or equal to 6 hours, greater than or equal to 2.5 hours to less than or equal to 6 hours, greater than or equal to 2.75 hours to less than or equal to 6 hours, greater than or equal to 3 hours to less than or equal to 6 hours, greater than or equal to 3.25 hours to less than or equal to 6 hours, greater than or equal to 3.5 hours to less than or equal to 6 hours, greater than or equal to 3.75 hours to less than or equal to 6 hours, greater than or equal to 4 hours to less than or equal to 6 hours, greater than or equal to 4.25 to less than or equal to 6 hours, greater than or equal to 4.5 hours to less than or equal to 6 hours, greater than or equal to 4.75 hours to less than or equal to 6 hours, greater than or equal to 5 hours to less than or equal to 6 hours, greater than or equal to 5.25 hours to less than or equal to 6 hours, greater than or equal to 5.5 hours to less than or equal to 6 hours, greater than or equal to 5.75 hours to less than or equal to 6 hours, greater than or equal to 0.25 hours to less than or equal to 5.75 hours, greater than or equal to 0.25 hours to less than or equal to 5.5 hours, greater than or equal to 0.25 hours to less than or equal to 5.25 hours greater than or equal to 0.25 hours to less than or equal to 5 hours, greater than or equal to 0.25 hours to less than or equal to 4.75 hours, greater than or equal to 0.25 hours to less than or equal to 4.5 hours, greater than or equal to 0.25 hours to less than or equal to 4.25 hours, greater than or equal to 0.25 hours to less than or equal to 4 hours, greater than or equal to 0.25 hours to less than or equal to 3.75 hours, greater than or equal to 0.25 hours to less than or equal to 3.5 hours, greater than or equal to 0.25 hours to less than or equal to 3.25 hours, greater than or equal to 0.25 hours to less than or equal to 3 hours, greater than or equal to 0.25 hours to less than or equal to 2.75 hours, greater than or equal to 0.25 hours to less than or equal to 2.5 hours, greater than or equal to 0.25 hours to less than or equal to 2.25 hours, greater than or equal to 0.25 hours to less than or equal to 1 hours, greater than or equal to 0.25 hours to less than or equal to 0.75 hours, greater than or equal to 0.25 hours to less than or equal to 0.5 hours, or any and all sub-ranges formed from any of these endpoints. In embodiments, heat treating the precursor glass in the heat treatment furnace at the first temperature for the first time may facilitate both nucleating and growing the desired crystalline phases in the precursor glass to form the glass-ceramic. In other embodiments, heat treating the precursor glass in the heat treatment furnace at the first temperature for the first time may facilitate nucleating the desired crystalline phases in the precursor glass and a second heat treatment step is implemented to grow the nucleated crystalline phases in the precursor glass to form the glass-ceramic.

For example, in embodiments the heat treatment may include a second step of heating the precursor glass in the heat treatment furnace at a rate of 1-10° C./min until the furnace reaches a second temperature. The second temperature may be different than the first temperature. The second temperature of the furnace may be from greater than or equal to 750° C. to less than or equal to 950° C. In embodiments, the second temperature may be greater than or equal to 750° C. to less than or equal to 950° C., greater than or equal to 770° C. to less than or equal to 950° C., greater than or equal to 790° C. to less than or equal to 950° C., greater than or equal to 810° C. to less than or equal to 950° C., greater than or equal to 830° C. to less than or equal to 950° C., greater than or equal to 850° C. to less than or equal to 950° C., greater than or equal to 870° C. to less than or equal to 950° C., greater than or equal to 890° C. to less than or equal to 950° C., greater than or equal to 910° C. to less than or equal to 950° C., greater than or equal to 930° C. to less than or equal to 950° C., greater than or equal to 750° C. to less than or equal to 930° C., greater than or equal to 750° C. to less than or equal to 910° C., greater than or equal to 750° C. to less than or equal to 890° C., greater than or equal to 750° C. to less than or equal to 870° C., greater than or equal to 750° C. to less than or equal to 850° C., greater than or equal to 750° C. to less than or equal to 830° C., greater than or equal to 750° C. to less than or equal to 810° C., greater than or equal to 750° C. to less than or equal to 790° C., greater than or equal to 750° C. to less than or equal to 770° C., or any and all sub-ranges formed from any of these endpoints. In embodiments, the processes for making the glass-ceramic includes maintaining the precursor glass at the second temperature for a second time in a range from greater than or equal to 0.25 hours to less than or equal to 6 hours. For example, without limitation, the precursor glass may be maintained at the second temperature for a second time in a range from greater than or equal to 0.25 hours to less than or equal to 6 hours, greater than or equal to 0.5 hours to less than or equal to 6 hours, greater than or equal to 0.75 hours to less than or equal to 6 hours, greater than or equal to 1 hour to less than or equal to 6 hours, greater than or equal to 1.25 hours to less than or equal to 6 hours, greater than or equal to 1.5 hours to less than or equal to 6 hours, greater than or equal to 1.75 hours to less than or equal to 6 hours, greater than or equal to 2 hours to less than or equal to 6 hours, greater than or equal to 2.25 hours to less than or equal to 6 hours, greater than or equal to 2.5 hours to less than or equal to 6 hours, greater than or equal to 2.75 hours to less than or equal to 6 hours, greater than or equal to 3 hours to less than or equal to 6 hours, greater than or equal to 3.25 hours to less than or equal to 6 hours, greater than or equal to 3.5 hours to less than or equal to 6 hours, greater than or equal to 3.75 hours to less than or equal to 6 hours, greater than or equal to 4 hours to less than or equal to 6 hours, greater than or equal to 4.25 to less than or equal to 6 hours, greater than or equal to 4.5 hours to less than or equal to 6 hours, greater than or equal to 4.75 hours to less than or equal to 6 hours, greater than or equal to 5 hours to less than or equal to 6 hours, greater than or equal to 5.25 hours to less than or equal to 6 hours, greater than or equal to 5.5 hours to less than or equal to 6 hours, greater than or equal to 5.75 hours to less than or equal to 6 hours, greater than or equal to 0.25 hours to less than or equal to 5.75 hours, greater than or equal to 0.25 hours to less than or equal to 5.5 hours, greater than or equal to 0.25 hours to less than or equal to 5.25 hours, greater than or equal to 0.25 hours to less than or equal to 5 hours, greater than or equal to 0.25 hours to less than or equal to 4.75 hours, greater than or equal to 0.25 hours to less than or equal to 4.5 hours, greater than or equal to 0.25 hours to less than or equal to 4.25 hours, greater than or equal to 0.25 hours to less than or equal to 4 hours, greater than or equal to 0.25 hours to less than or equal to 3.75 hours, greater than or equal to 0.25 hours to less than or equal to 3.5 hours, greater than or equal to 0.25 hours to less than or equal to 3.25 hours, greater than or equal to 0.25 hours to less than or equal to 3 hours, greater than or equal to 0.25 hours to less than or equal to 2.75 hours, greater than or equal to 0.25 hours to less than or equal to 2.5 hours, greater than or equal to 0.25 hours to less than or equal to 2.25 hours, greater than or equal to 0.25 hours to less than or equal to 1 hours, greater than or equal to 0.25 hours to less than or equal to 0.75 hours, greater than or equal to 0.25 hours to less than or equal to 0.5 hours, or any and all sub-ranges formed from any of these endpoints. Heat treating the precursor glass with nucleated crystalline phases in the heat treatment furnace at the second temperature for the second time facilitates growing the desired crystalline phases in the precursor glass to form the glass-ceramic.

In embodiments, heat-treating the precursor glass may further comprise heating the precursor glass in the heat treatment furnace to one or more subsequent furnace temperatures from greater than or equal to 750° C. to less than or equal to 950° C. and holding the precursor glass at each subsequent furnace temperature for a time in a range from greater than or equal to 0.25 hours to less than or equal to 6 hours.

In embodiments, heat-treating the precursor glass may occur at ambient pressure. In embodiments, heat-treating the precursor glass may occur at ambient atmospheric pressure (101.325 kPa). In embodiments, heat-treating the precursor glass may occur at about 100 kPa. In one or more embodiments, heat treating the precursor glass may occur at a pressure of less than or equal to 15 GPa. For example, without limitation, heat-treating the precursor glass may occur at a pressure of less than or equal to 15 GPa, less than or equal to 10 GPa, less than or equal to 5 GPa, or less than or equal to 1 GPa.

Following heat-treating (i.e., following the nucleation and growth of the crystalline phase(s) in the precursor glass), at least some of the grains of the crystalline phase having the jeffbenite crystalline structure overlap and interlock within one another within the residual glass phase.

In embodiments, the resultant glass-ceramic may be transparent, translucent, or opaque. In embodiments, the glass-ceramics have an average transmittance of >85% of light over the wavelength range from about 400 nm to about 1,000 nm at an article thickness of 0.85 mm. In embodiments, the average transmittance for the glass-ceramic is about 85% or greater, about 86% or greater, about 87% or greater, about 88% or greater, about 89% or greater, about 90% or greater, about 91% or greater, about 92% or greater, about 93% or greater for light over the wavelength range of about 400 nm to about 1000 nm at an article thickness of 0.85 mm. In embodiments, the resultant glass-ceramic may be colored.

In embodiments, the resultant glass-ceramic may have a density from greater than or equal to 2.65 g/cm$^3$ to less than or equal to 2.95 g/cm$^3$. For example, without limitation, the glass-ceramic may have a density greater than or equal to 2.65 g/cm$^3$ to less than or equal to 2.95 g/cm$^3$, greater than or equal to 2.70 g/cm$^3$ to less than or equal to 2.95 g/cm$^3$, greater than or equal to 2.75 g/cm$^3$ to less than or equal to 2.95 g/cm$^3$, greater than or equal to 2.80 g/cm$^3$ to less than or equal to 2.95 g/cm$^3$, greater than or equal to 2.85 g/cm$^3$ to less than or equal to 2.95 g/cm$^3$, greater than or equal to 2.90 g/cm$^3$ to less than or equal to 2.95 g/cm$^3$, greater than or equal to 2.75 g/cm$^3$ to less than or equal to 2.90 g/cm$^3$, greater than or equal to 2.75 g/cm$^3$ to less than or equal to 2.85 g/cm$^3$, greater than or equal to 2.75 g/cm$^3$ to less than or equal to 2.80 g/cm$^3$, or any and all sub-ranges formed from any of these endpoints. Without intending to be bound by theory, the presence of a crystalline phase having a jeffbenite crystalline structure in the glass-ceramic article may result in a glass-ceramic with a relatively high density when considering the relatively lightweight components of the glass-ceramic precursor.

In embodiments, the resultant glass-ceramic may comprise a crystalline phase having a jeffbenite crystalline structure. In embodiments, at least some of the grains of the crystalline phase having the jeffbenite crystalline structure in the glass-ceramic, or even a majority of the grains, may have a dimension (e.g., measured from a sectioned/polished cut of glass-ceramic, where the "dimension" is a linear cross-sectional dimension, measured from opposite facing outermost surfaces of the grain through a geometric centroid of the grain along a surface of the sectioned/polished cut of glass-ceramic, such as longest cross-sectional dimension, shortest cross-sectional dimension, average cross-sectional dimension; unless otherwise specified, "dimension" in this context refers to the longest such cross-sectional dimension for a given grain; see grains shown in FIGS. 3-4, 6A-6F, and generally in FIG. 9) less than the wavelength of visible light. For example, without limitation, at least some of the grains of the crystalline phase having the jeffbenite crystalline structure, or even a majority of the grains, may have a dimension of less than or equal to 500 nm, 400 nm, 350 nm, 300 nm, 250 nm, 200 nm, 150 nm, or even less than or equal to 100 nm. In embodiments, at least some of the grains of the crystalline phase having the jeffbenite crystalline structure in the glass-ceramic, or even a majority of the grains, may have a dimension greater than or equal to 20 nm or even greater than or equal to 30 nm. For example, without limitation, at least some of the grains of the crystalline phase having the jeffbenite crystalline structure in the glass-ceramic, or even a majority, may have a dimension greater than or equal to 20 nm to less than or equal to 100 nm, greater than or equal to 30 nm to less than or equal to 100 nm, greater than or equal to 40 nm to less than or equal to 100 nm, greater than or equal to 50 nm to less than or equal to 100 nm, greater than or equal to 60 nm to less than or equal to 100 nm, greater than or equal to 70 nm to less than or equal to 100 nm, greater than or equal to 80 nm to less than or equal to 100 nm, greater than or equal to 90 nm to less than or equal to 100 nm, greater than or equal to 20 nm to less than or equal to 90 nm, greater than or equal to 30 nm to less than or equal to 90 nm, greater than or equal to 20 nm to less than or equal to 80 nm, greater than or equal to 30 nm to less than or equal to 80 nm, greater than or equal to 20 nm to less than or equal to 70 nm, greater than or equal to 30 nm to less than or equal to 70 nm, greater than or equal to 20 nm to less than or equal to 60 nm, greater than or equal to 30 nm to less than or equal to 60 nm, greater than or equal to 20 nm to less than or equal to 50 nm, greater than or equal to 30 nm to less than or equal to 50 nm, greater than or equal to 20 nm to less than or equal to 40 nm, greater than or equal to 30 nm to less than or equal to 40 nm, or any and all sub-ranges formed from any of these endpoints. In embodiments, at least some of the grains of the crystalline phase having the jeffbenite crystalline structure may be in an elongate form. In embodiments, at least some of the grains of the crystalline phase having the jeffbenite crystalline structure may comprise an acicular or tabular shape. In embodiments, the grains of the crystalline phase having the jeffbenite crystalline structure may comprise a bulk elastic modulus of about 170 GPa. In embodiments, the grains of the crystalline phase having the jeffbenite crystalline structure may comprise a hardness of about 1350 VHn.

In embodiments, the resultant glass-ceramic may comprise a phase assemblage in which at least some of the grains of the crystalline phases of the phase assemblage, or even a majority, have a dimension less than the wavelength of visible light. For example, without limitation, at least some of the grains of the crystalline phases in the phase assemblage, or even a majority, may have a dimension of less than or equal to 500 nm, 400 nm, 350 nm, 300 nm, 250 nm, 200 nm, 150 nm, or even less than or equal to 100 nm. In embodiments, at least some of the grains of the crystalline phases in the phase assemblage, or even a majority, may have a dimension greater than or equal to 20 nm or even greater than or equal to 30 nm. For example, without limitation, at least some of the grains of the crystalline phases in the glass-ceramic, or even a majority, may have a grain size greater than or equal to 20 nm to less than or equal to 100 nm, greater than or equal to 30 nm to less than or equal to 100 nm, greater than or equal to 40 nm to less than or equal to 100 nm, greater than or equal to 50 nm to less than or equal to 100 nm, greater than or equal to 60 nm to less than or equal to 100 nm, greater than or equal to 70 nm to less than or equal to 100 nm, greater than or equal to 80 nm to less than or equal to 100 nm, greater than or equal to 90 nm to less than or equal to 100 nm, greater than or equal to 20 nm to less than or equal to 90 nm, greater than or equal to 30 nm to less than or equal to 90 nm, greater than or equal to 20 nm to less than or equal to 80 nm, greater than or equal to 30 nm to less than or equal to 80 nm, greater than or equal to 20 nm to less than or equal to 70 nm, greater than or equal to 30 nm to less than or equal to 70 nm, greater than or equal to 20 nm to less than or equal to 60 nm, greater than or equal to 30 nm to less than or equal to 60 nm, greater than or equal to 20 nm to less than or equal to 50 nm, greater than or equal to 30 nm to less than or equal to 50 nm, greater than or equal to 20 nm to less than or equal to 40 nm, greater than or equal to 30 nm to less than or equal to 40 nm, or any and all sub-ranges formed from any of these endpoints.

In embodiments, the glass-ceramic may have an elastic modulus greater than or equal to 50 GPa and less than or equal to 200 GPa. In embodiments, the glass-ceramic may have an elastic modulus greater than or equal to 50 GPa, greater than or equal to 80 GPa, greater than or equal to 90 GPa, or even greater than or equal to 100 GPa. In embodiments, the glass-ceramic may have an elastic modulus less than or equal to 200 GPa or even less than or equal to 150 GPa. In embodiments, the glass-ceramic may have an elastic modulus greater than or equal to 50 GPa and less than or equal to 200 GPa, greater than or equal to 50 GPa and less than or equal to 175 GPa, greater than or equal to 60 GPa and less than or equal to 175 GPa, greater than or equal to 60 GPa and less than or equal to 150 GPa, greater than or equal to 70 GPa and less than or equal to 175 GPa, greater than or equal to 70 GPa and less than or equal to 150 GPa, greater than or equal to 80 GPa and less than or equal to 175 GPa, or even greater than or equal to 80 GPa and less than or equal to 150 GPa, or any and all sub-ranges formed from any of these endpoints.

In embodiments, the glass-ceramics exhibit a fracture toughness of about 0.75 MPa·m$^{1/2}$ or greater, about 0.85 MPa·m$^{1/2}$ or greater, about 1.0 MPa·m$^{1/2}$ or greater, about 1.1 MPa·m$^{1/2}$ or greater, 1.2 MPa·m$^{1/2}$ or greater, 1.3 MPa·m$^{1/2}$ or greater, 1.4 MPa·m$^{1/2}$ or greater, 1.5 MPa·m$^{1/2}$ or greater, 1.6 MPa·m$^{1/2}$ or greater, 1.7 MPa·m$^{1/2}$ or greater, 1.8 MPa·m$^{1/2}$ or greater, 1.9 MPa·m$^{1/2}$ or greater, or about 2.0 MPa·m$^{1/2}$ In embodiments, the fracture toughness is in the range from greater than or equal to 0.75 MPa·m$^{1/2}$ to less than or equal to 2 MPa·m$^{1/2}$, or any and all sub-ranges formed from any of these endpoints.

In one or more embodiments, the glass-ceramics have high crack and scratch resistance by exhibiting a Vickers hardness. In some embodiments, a non-ion-exchanged glass-ceramic exhibits a Vickers hardness in the range from greater than or equal to 600 kgf/mm$^2$ to less than or equal to 1400 kgf/mm$^2$, greater than or equal to 600 kgf/mm$^2$ to less than or equal to 1300 kgf/mm$^2$, greater than or equal to 600 kgf/mm$^2$ to less than or equal to 1200 kgf/mm$^2$, greater than or equal to 600 kgf/mm$^2$ to less than or equal to 1100 kgf/mm$^2$, greater than or equal to 600 kgf/mm$^2$ to less than or equal to 1000 kgf/mm$^2$, greater than or equal to 600 kgf/mm$^2$ to less than or equal to 900 kgf/mm$^2$, greater than or equal to 600 kgf/mm$^2$ to less than or equal to 875 kgf/mm$^2$, greater than or equal to 600 kgf/mm$^2$ to less than or equal to 850 kgf/mm$^2$, greater than or equal to 600 kgf/mm$^2$ to less than or equal to 825 kgf/mm$^2$, greater than or equal to 600 kgf/mm$^2$ to less than or equal to 800 kgf/mm$^2$, greater than or equal to 600 kgf/mm$^2$ to less than or equal to 775 kgf/mm$^2$, greater than or equal to 600 kgf/mm$^2$ to less than or equal to 750 kgf/mm$^2$, greater than or equal to 600 kgf/mm$^2$ to less than or equal to 725 kgf/mm$^2$, greater than or equal to 600 kgf/mm$^2$ to less than or equal to 700 kgf/mm$^2$, greater than or equal to 700 kgf/mm$^2$ to less than or equal to 900 kgf/mm$^2$, greater than or equal to 700 kgf/mm$^2$ to less than or equal to 875 kgf/mm$^2$, greater than or equal to 700 kgf/mm$^2$ to less than or equal to 850 kgf/mm$^2$, greater than or equal to 700 kgf/mm$^2$ to less than or equal to 825 kgf/mm$^2$, or greater than or equal to 700 kgf/mm$^2$ to less than or equal to 800 kgf/mm$^2$. In some embodiments, a Vickers hardness is 600 kgf/mm$^2$ or greater, 625 kgf/mm$^2$ or greater, 650 kgf/mm$^2$ or greater, 675 kgf/mm² or greater, 700 kgf/mm² or greater, 725 kgf/mm² or greater, 750 kgf/mm² or greater, 775 kgf/mm² or greater, 800 kgf/mm² or greater, 825 kgf/mm² or greater, 850 kgf/mm² or greater, 875 kgf/mm² or greater, or 900 kgf/mm² or greater, or any and all sub-ranges formed from any of these endpoints.

The resultant glass-ceramic may be provided as a sheet, which may then be reformed by pressing, blowing, bending, sagging, vacuum forming, or other means into curved or bent pieces of uniform thickness. Reforming may be done before thermally treating or the forming step may also serve as a thermal treatment step in which both forming and thermal treating are performed substantially simultaneously.

The glass-ceramics and glass-ceramic articles described herein may be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In embodiments, a consumer electronic device (e.g., smartphones, tablet computers, personal computers, ultrabooks, televisions, and cameras), an architectural glass, and/or an automotive glass may comprise a glass article as described herein.

Figure 2:
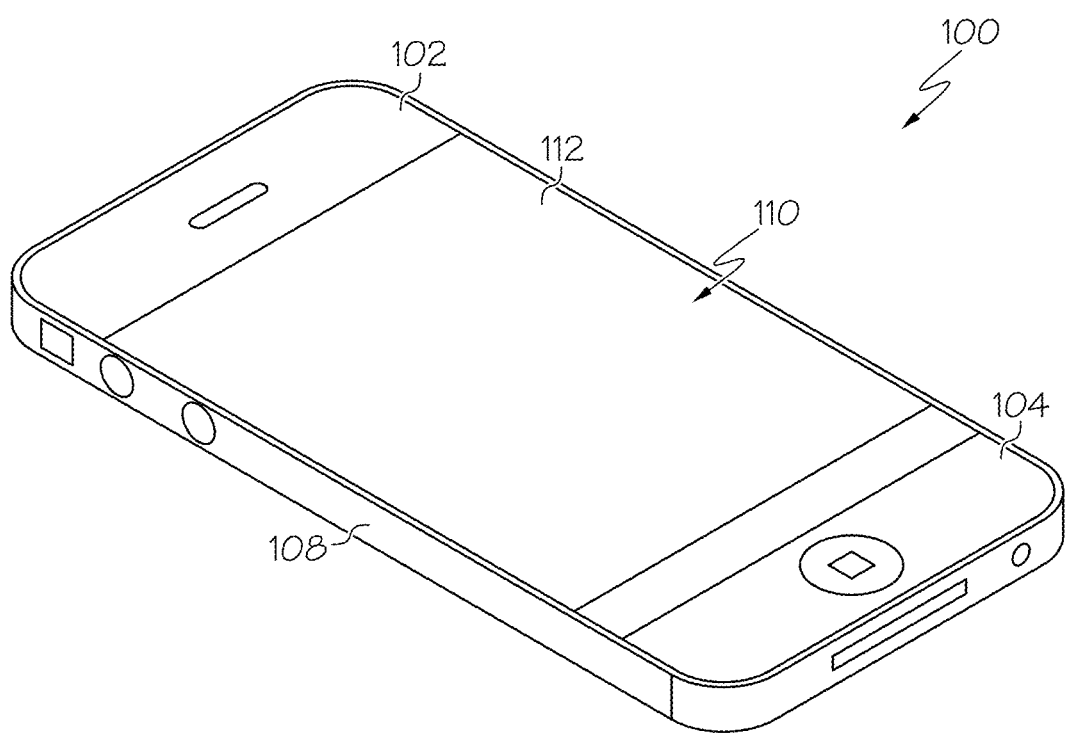
FIG. 2 is a perspective view of an electronic device comprising a glass-ceramic article according to one or more embodiments described herein.

An exemplary electronic device incorporating any of the glass-ceramic articles disclosed herein is shown in FIGS. 1 and 2. Specifically, FIGS. 1 and 2 show a consumer electronic device 100 including a housing 102 having a front surface 104, a back surface 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of at least one of the cover substrate 112 and the housing 102 may include any of the glass-ceramic articles disclosed herein.

Figure 8A:
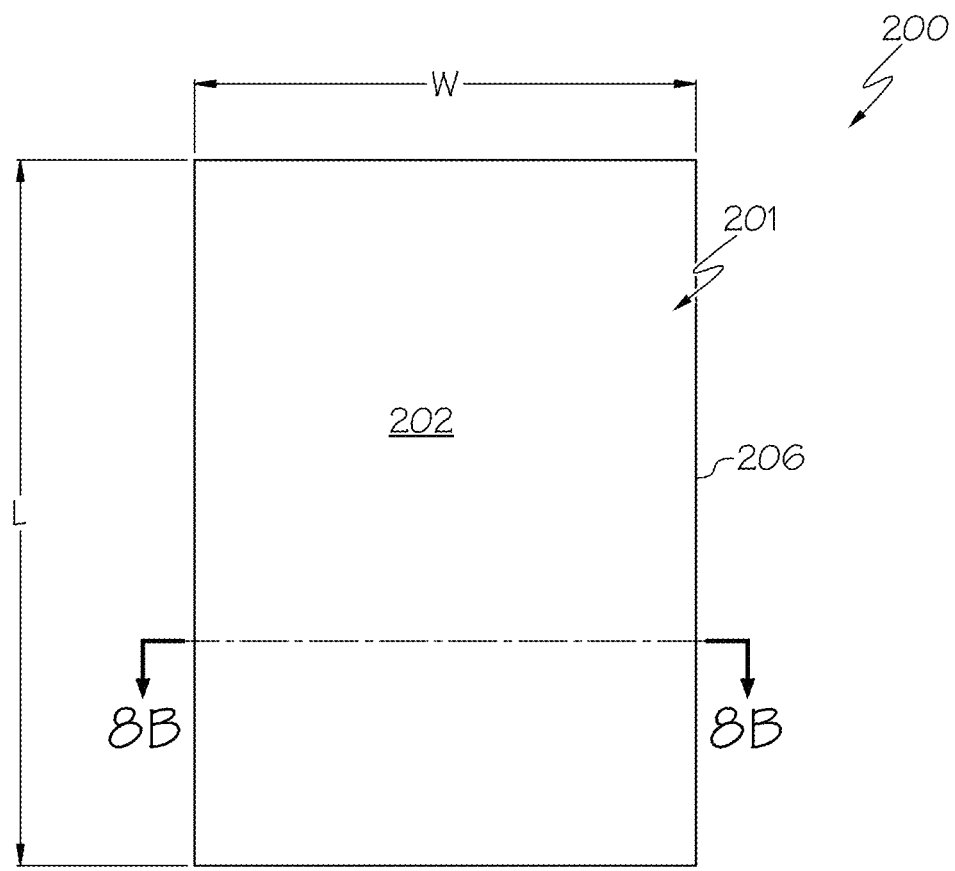
FIG. 8A schematically depicts a glass-ceramic article according to one or more embodiments described herein.
Figure 8B:
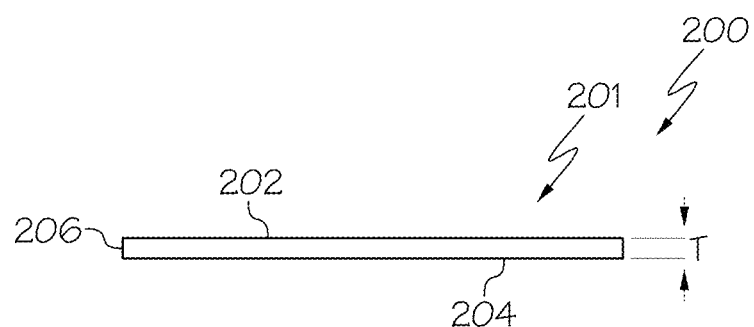
FIG. 8B schematically depicts a cross section of the glass-ceramic article of FIG. 8B.

Referring now to FIGS. 8A and 8B, an embodiment of a glass-ceramic article 200 formed from glass-ceramics described herein is depicted. In this embodiment, the glass-ceramic article is in the form of a glass sheet and may comprise a body 201 disposed between a first surface 202 opposite a second surface 204. The body 201 comprises or consists essentially of a glass-ceramic as described herein. The first surface 202 and the second surface 204 may be major surfaces of the glass sheet that face away from one another. In embodiments, the first surface 202 and the second surface 204 may be generally planar and spaced apart from one another by a thickness T defined between the first surface 202 and the second surface 204. The first surface 202 and the second surface 204 are delimited by at least one edge 206 forming a perimeter that generally defines a shape of the glass-ceramic article 200. In the embodiment depicted in FIGS. 8A and 8B, the glass-ceramic article is rectangular in shape and comprises a length L and a width W. In this embodiment, the width W of the glass sheet is defined as the distance along the first surface 202 orthogonal to the thickness T and between opposing edges. The length L is defined as the distance along the first surface 202 orthogonal to the thickness T and the width W and between opposing edges.

In embodiments, the width W may be greater than or equal to the thickness T and the length L may be greater than or equal to the width W. However, it should be understood that other shapes of the glass-ceramic article are contemplated and possible, including, without limitation, squares, circles, and other regular or irregular geometric shapes. For example, a glass-ceramic article may also include a rod, a fiber, a boule, curved sheet, tube, bowl, lens, vial, bottle, or other container.

In embodiments, the thickness T of the glass-ceramic article 200 may be as described herein. The length L and the width W of the glass-ceramic article may be selected according to the specific application in which the glass-ceramic article 200 is employed. In embodiments, the length L and the width W of the glass-ceramic article may be greater than or equal to 5 mm, such as greater than or equal to 10 mm, greater than or equal to 15 mm, greater than or equal to 20 mm, greater than or equal to 25 mm, and greater than or equal to 30 mm. For example, and without limitation, the length L of the glass-ceramic article may be greater than or equal to 30 mm to less than or equal to 1 m, greater than or equal to 30 mm to less than or equal to 75 cm, greater than or equal to 30 mm to less than or equal to 50 cm, greater than or equal 30 mm to less than or equal to 25 cm, greater than or equal to 30 mm to less than or equal to 20 cm, greater than or equal to 30 mm to less than or equal to 15 cm, greater than or equal to 30 mm to less than or equal to 10 cm, greater than or equal to 30 mm to less than or equal to 5 cm, or any and all sub-ranges formed from any of these endpoints. The width W of the glass-ceramic article may be greater than or equal to 30 mm to less than or equal to 1 m, greater than or equal to 30 mm to less than or equal to 75 cm, greater than or equal to 30 mm to less than or equal to 50 cm, greater than or equal 30 mm to less than or equal to 25 cm, greater than or equal to 30 mm to less than or equal to 20 cm, greater than or equal to 30 mm to less than or equal to 15 cm, greater than or equal to 30 mm to less than or equal to 10 cm, greater than or equal to 30 mm to less than or equal to 5 cm, or any and all sub-ranges formed from any of these endpoints. In embodiments where the glass-ceramic article is a glass sheet, as depicted in FIGS. 8A and 8B, the surfaces of the glass sheet may have an area greater than or equal to 25 mm². In embodiments where the glass-ceramic article is a glass sheet, the glass-ceramic in the body 201 of the glass sheet may have a volume greater than or equal to 25 mm³.

In embodiments, the body 201 of the glass-ceramic article 200 has an average transmittance of at least 75% for a light in a wavelength range from 400 nm to 800 nm (inclusive of endpoints) at an article thickness of 0.85 mm such that the glass-ceramic article is transparent. In embodiments, the body 201 of the glass-ceramic article 200 has an average transmittance of greater than or equal to 20% to less than 75% for light in a wavelength range from 400 nm to 800 nm (inclusive of endpoints) at an article thickness of 0.85 mm such that the glass-ceramic article is translucent. In embodiments, the body of the glass-ceramic article has an average transmittance less than 20% when measured at normal incidence for light in a wavelength range from 400 nm to 800 nm (inclusive of endpoints) at an article thickness of 0.85 mm such that the glass-ceramic article is opaque. In embodiments, the body 201 of the glass-ceramic article 200 is at least partially translucent such that at least 20% of light having a wavelength of 400 nm to 800 nm directed into the thickness of the article is transmitted through the body.

Examples

In order that various embodiments be more readily understood, reference is made to the following examples, which are intended to illustrate various embodiments of the glass-ceramics described herein.

Table 1 shows example precursor glass and glass-ceramic compositions (in terms of mol. %), the ceram schedule for achieving glass-ceramic articles, and the respective properties of the precursor glasses and glass-ceramic articles. Individual samples were formed by melting a batch of constituent components to form the precursor glass having the indicated composition. The molten precursor glass was then poured into a steel mold and cooled to form pucks. Pucks of the precursor glass were sectioned and then heat treated to form the glass-ceramic. Samples of the glass-ceramic were approximately 1 cm thick (unless otherwise specified). Properties of the glass-ceramics were then determined including the crystalline phases, the appearance of the sample, the % volume decrease upon crystallization of the sample (i.e., the shrinkage), the precursor glass density, the glass-ceramic (GC) density, the % increase in density, the elastic modulus, the Shear Modulus, Poisson's ratio, fracture toughness, and Vickers hardness. When describing the appearance of the samples, the term "white" refers to glass-ceramics that were white and opaque. The term "opal" refers to glass-ceramics that were white and slightly translucent. The term "transparent opal" refers to glass-ceramics that were white but more translucent.

TABLE 1

| Batched Comp (mol. %) | A | B | C | D | E | F | G |
|---|---|---|---|---|---|---|---|
| $SiO_2$ | 54.46 | 50.66 | 41.07 | 52.42 | 48.60 | 45.93 | 52.83 |
| $Al_2O_3$ | 9.18 | 8.43 | 13.70 | 11.48 | 9.88 | 11.18 | 9.80 |
| MgO | 23.37 | 28.87 | 41.09 | 25.42 | 32.25 | 35.15 | 25.67 |
| $Na_2O$ | 4.65 | 4.25 | 0.00 | 4.63 | 3.23 | 2.09 | 4.06 |
| $K_2O$ | 4.75 | 4.26 | 0.00 | 2.36 | 3.16 | 2.10 | 4.10 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 3.10 | 2.33 | 4.03 | 3.56 | 2.79 | 2.75 | 3.08 |
| $TiO_2$ | 0.37 | 1.08 | 0.00 | 0.00 | 0.00 | 0.71 | 0.37 |
| $P_2O_5$ | 0.00 | 0.00 | 0.00 | 0.00 | 0.00 | 0.00 | 0.00 |
| $SnO_2$ | 0.12 | 0.11 | 0.11 | 0.12 | 0.09 | 0.09 | 0.10 |
| $MnO_2$ | 0.00 | 0.00 | 0.00 | 0.00 | 0.00 | 0.00 | 0.00 |
| Ceram Schedule, Temperature (° C.)-Hours | 725-4, 850-2 | 725-4, 850-4 | | | | | 765-6, 825-2 |
| Crystalline Phases | Phase with jeffbenite structure, $ZrO_2$ | Phase with jeffbenite structure, $ZrO_2$ | | | | | Phase with jeffbenite structure, $ZrO_2$ |
| Appearance | Translucent | Translucent | | | | | Translucent |
| % Volume Decrease on Crystallization | −5.16 | | | | | | −7.74 |
| Glass Density (g/cm³) | 2.65 | | | | | | |
| GC Density (g/cm³) | 2.72 | | | | | | |
| % Increase | 2.64 | | | | | | |
| Elastic Modulus (GPa) | 90.39 | | | | | | |
| Shear Modulus (GPa) | 37.51 | | | | | | |
| Poisson's ratio | 0.21 | | | | | | |
| Fracture Toughness (MPa√m) | 0.85 | | | | | | |
| Vickers Hardness (kgf/mm²) | 680.9 | | | | | | |

| Batched Comp (mol. %) | H | I | J | K | L | M | N |
|---|---|---|---|---|---|---|---|
| $SiO_2$ | 47.71 | 44.04 | 46.60 | 46.66 | 46.64 | 46.52 | 46.43 |
| $Al_2O_3$ | 11.56 | 7.90 | 11.25 | 11.24 | 11.23 | 11.21 | 11.22 |
| MgO | 32.65 | 44.12 | 33.48 | 33.54 | 33.43 | 33.47 | 33.45 |
| $Na_2O$ | 2.31 | 0.00 | 2.81 | 2.78 | 2.82 | 2.86 | 2.82 |
| $K_2O$ | 2.31 | 0.00 | 1.61 | 0.00 | 0.00 | 0.00 | 0.00 |
| CaO | 0.00 | 0.00 | 0.00 | 1.59 | 0.00 | 0.00 | 0.00 |
| SrO | 0.00 | 0.00 | 0.00 | 0.00 | 1.63 | 0.00 | 0.00 |
| BaO | 0.00 | 0.00 | 0.00 | 0.00 | 0.00 | 1.64 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 1.68 |
| $ZrO_2$ | 3.02 | 2.55 | 2.74 | 2.71 | 2.75 | 2.78 | 2.84 |
| $TiO_2$ | 0.36 | 1.31 | 1.41 | 1.39 | 1.41 | 1.43 | 1.46 |
| $P_2O_5$ | 0.00 | 0.00 | 0.00 | 0.00 | 0.00 | 0.00 | 0.00 |
| $SnO_2$ | 0.09 | 0.09 | 0.09 | 0.09 | 0.09 | 0.09 | 0.10 |

TABLE 1-continued

| | | | | | | | |
|---|---|---|---|---|---|---|---|
| MnO$_2$ | 0.00 | 0.00 | 0.00 | 0.00 | 0.00 | 0.00 | 0.00 |
| Ceram Schedule, Temperature (° C.)-Hours | 765-4, 800-6 | 800-4, 900-4 | 800-4, 900-4 | 800-4, 900-4 | 800-4, 900-4 | 780-4, 850-4 | 800-4, 900-4 |
| Crystalline Phases | Phase with jeffbenite structure | Phase with jeffbenite structure, Enstatite | Phase with jeffbenite structure | Phase with jeffbenite | Phase with jeffbenite structure | Phase with jeffbenite structure | Phase with jeffbenite structure, Y$_2$ZrO$_5$ |
| Appearance | Hazy Transparent | White Opal | Opal | Transparent Areas | Translucent | Translucent | Opaque |
| % Volume Decrease on Crystallization | −19.11 | −10.43 | −7.02 | −14.66 | −11.73 | −48.41 | −17.09 |
| Glass Density (g/cm$^3$) | | 2.76 | | | | | |
| GC Density (g/cm$^3$) | | 2.95 | | | | | |
| % Increase | | 6.70 | | | | | |
| Elastic Modulus (GPa) | | 120.94 | | | | | |
| Shear Modulus (GPa) | | 49.02 | | | | | |
| Poisson's ratio | | 0.23 | | | | | |
| Fracture Toughness (MPa√m) | | 1.11 | | | | | |
| Vickers Hardness (kgf/mm$^2$) | | | | | | | |

| Batched Comp (mol. %) | O | P | Q | R | S | T | U |
|---|---|---|---|---|---|---|---|
| SiO$_2$ | 45.05 | 44.95 | 45.05 | 42.40 | 42.81 | 43.11 | 43.03 |
| Al$_2$O$_3$ | 9.66 | 9.64 | 9.66 | 11.34 | 12.88 | 12.23 | 12.21 |
| MgO | 37.31 | 29.20 | 29.26 | 36.76 | 35.74 | 36.63 | 27.70 |
| Na$_2$O | 2.95 | 2.94 | 2.95 | 3.79 | 4.20 | 2.93 | 2.90 |
| K$_2$O | 1.44 | 1.44 | 1.44 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 8.24 | 0.00 | 0.00 | 0.00 | 0.00 | 8.67 |
| FeO | 0.00 | 0.00 | 8.04 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 2.39 | 2.39 | 2.39 | 3.52 | 2.85 | 3.58 | 3.59 |
| TiO$_2$ | 1.11 | 1.10 | 1.11 | 2.11 | 1.44 | 1.44 | 1.45 |
| P$_2$O$_5$ | 0.00 | 0.00 | 0.00 | 0.00 | 0.00 | 0.00 | 0.00 |
| SnO$_2$ | 0.10 | 0.10 | 0.10 | 0.08 | 0.08 | 0.08 | 0.09 |
| MnO$_2$ | 0.00 | 0.00 | 0.00 | 0.00 | 0.00 | 0.00 | 0.37 |
| Ceram Schedule, Temperature (° C.)-Hours | 780-4, 850-4 | 750-4, 800-4 | 780-4, 850-4 | 780-4, 850-4 | 780-4, 850-4 | | |
| Crystalline Phases | Phase with jeffbenite structure | Phase with jeffbenite structure | Phase with jeffbenite structure | Phase with jeffbenite structure | Phase with jeffbenite structure, Unknown, ZrO$_2$ | | |
| Appearance | Translucent Opal | White Opaque | Black | Translucent | White Opal | | |
| % Volume Decrease on Crystallization | −22.13 | −10.86 | −6.98 | −4.89 | | | −17.3 |
| Glass Density (g/cm$^3$) | 2.92 | | 2.86 | 2.80 | | | |
| GC Density (g/cm$^3$) | 2.98 | | 3.06 | 2.98 | | | |
| % Increase | 2.05 | | 6.99 | 6.43 | | | |
| Elastic Modulus (GPa) | | | 132.8 | 124.94 | | | |
| Shear Modulus (GPa) | | | 53.57 | 50.33 | | | |
| Poisson's ratio | | | 0.24 | 0.24 | | | |
| Fracture Toughness (MPa√m) | | | | | | | |
| Vickers Hardness (kgf/mm$^2$) | | | | | | | |

| Batched Comp (mol. %) | V | W | X | Y | Z | AA | BB |
|---|---|---|---|---|---|---|---|
| SiO$_2$ | 44.61 | 44.49 | 45.79 | 42.82 | 43.78 | 44.55 | 39.48 |
| Al$_2$O$_3$ | 8.38 | 7.36 | 10.91 | 11.43 | 11.70 | 9.48 | 10.65 |
| MgO | 38.48 | 27.84 | 33.67 | 39.98 | 37.85 | 36.47 | 36.75 |
| Na$_2$O | 2.93 | 3.15 | 3.06 | 0.00 | 0.00 | 2.93 | 0.00 |
| K$_2$O | 0.00 | 0.00 | 0.00 | 0.00 | 0.80 | 1.37 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 7.87 |
| ZnO | 0.00 | 10.69 | 0.00 | 0.00 | 0.00 | 0.00 | 0.00 |
| FeO | 0.00 | 0.00 | 0.00 | 0.00 | 0.00 | 0.00 | 0.00 |

TABLE 1-continued

| | | | | | | | |
|---|---|---|---|---|---|---|---|
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 3.32 | 4.25 | 4.27 | 4.28 | 4.38 | 3.52 | 3.32 |
| TiO$_2$ | 2.20 | 2.13 | 2.22 | 1.42 | 1.41 | 1.61 | 1.85 |
| P$_2$O$_5$ | 0.00 | 0.00 | 0.00 | 0.00 | 0.00 | 0.00 | 0.00 |
| SnO$_2$ | 0.08 | 0.08 | 0.08 | 0.08 | 0.08 | 0.08 | 0.09 |
| MnO$_2$ | 0.00 | 0.00 | 0.00 | 0.00 | 0.00 | 0.00 | 0.00 |
| Ceram Schedule, Temperature (° C.)-Hours | 800-4, 900-4 | | 780-4, 850-4 | 780-4, 875-4 | 780-4, 850-4 | 780-4, 850-4 | 780-4, 850-4 |
| Crystalline Phases | Phase with jeffbenite structure, Mg-Titanate | | Phase with jeffbenite structure, ZrO$_2$ | Phase with jeffbenite structure, Unknown Phase (~1:1), ZrO$_2$ | Phase with jeffbenite structure, ZrO$_2$ | Phase with jeffbenite structure, ZrO$_2$ | Phase with jeffbenite structure |
| Appearance | White, Waxy Fracture | | Translucent | Grey-white | Translucent to Transparent | Opal | |
| % Volume Decrease on Crystallization | | −9.92 | | | −5.4 | | |
| Glass Density (g/cm$^3$) | | | | 2.86 | | | |
| GC Density (g/cm$^3$) | | | | 3.10 | | | |
| % Increase Elastic Modulus (GPa) | | | | 8.22 | | | |
| Shear Modulus (GPa) | | | | | | | |
| Poisson's ratio | | | | | | | |
| Fracture Toughness (MPa√m) | | | | | | | |
| Vickers Hardness (kgf/mm$^2$) | | | | | | | |

| Batched Comp (mol. %) | CC | DD | EE | FF | GG |
|---|---|---|---|---|---|
| SiO$_2$ | 43.71 | 44.38 | 41.57 | 54.46 | 50.66 |
| Al$_2$O$_3$ | 13.95 | 14.02 | 10.72 | 9.18 | 8.43 |
| MgO | 32.10 | 22.93 | 27.29 | 23.37 | 28.87 |
| Na$_2$O | 0.00 | 3.00 | 2.77 | 4.65 | 4.25 |
| K$_2$O | 4.35 | 1.48 | 1.37 | 4.75 | 4.26 |
| CaO | 0.00 | 0.00 | 0.00 | 0.00 | 0.00 |
| SrO | 0.00 | 0.00 | 0.00 | 0.00 | 0.00 |
| BaO | 0.00 | 0.00 | 0.00 | 0.00 | 0.00 |
| ZnO | 0.00 | 8.91 | 11.05 | 0.00 | 0.00 |
| FeO | 0.00 | 0.00 | 0.00 | 0.00 | 0.00 |
| Li$_2$O | 0.00 | 0.00 | 0.00 | 0.00 | 0.00 |
| Y$_2$O$_3$ | 0.00 | 0.00 | 0.00 | 0.00 | 0.00 |
| ZrO$_2$ | 4.37 | 3.72 | 3.81 | 3.10 | 2.33 |
| TiO$_2$ | 1.44 | 1.50 | 1.38 | 0.37 | 1.08 |
| P$_2$O$_5$ | 0.00 | 0.00 | 0.00 | 0.00 | 0.00 |
| SnO$_2$ | 0.08 | 0.04 | 0.04 | 0.12 | 0.11 |
| MnO$_2$ | 0.00 | 0.00 | 0.00 | 0.00 | 0.00 |
| Ceram Schedule, Temperature (° C.)-Hours | 780-4, 850-4 | 740-4, 790-4 | 740-4, 790-4 | 800-4, 925-4 | 800-4, 925-4 |
| Crystalline Phases | Phase with jeffbenite structure, ZrO$_2$ | Unknown, Phase with jeffbenite structure, Mg$_2$Zr$_5$O$_{12}$ | Phase with jeffbenite structure, ZrO$_2$ | Phase with jeffbenite structure, ZrO$_2$ | |
| Appearance | | Translucent | Opal to Translucent | Opaque | Opaque |
| % Volume Decrease on Crystallization | −22.49 | −14.03 | | | |
| Glass Density (g/cm$^3$) | | | | | |
| GC Density (g/cm$^3$) | | | | | |
| % Increase Elastic Modulus (GPa) | | | | | |
| Shear Modulus (GPa) | | | | | |
| Poisson's ratio | | | | | |
| Fracture Toughness (MPa√m) | | | | | |
| Vickers Hardness (kgf/mm$^2$) | | | | | |

Figure 3:
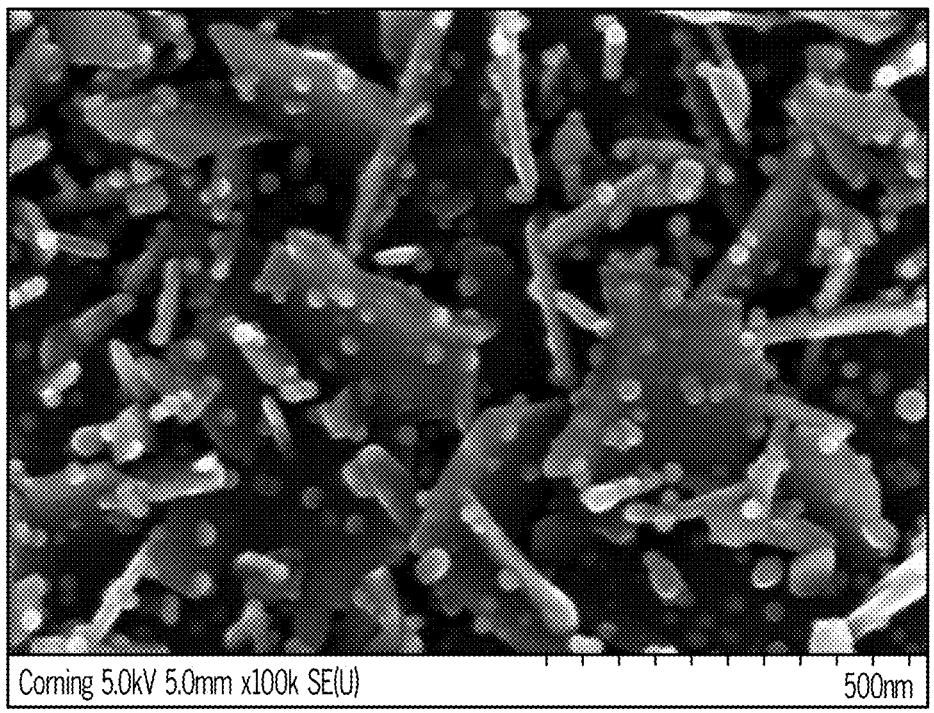
FIG. 3 is an SEM micrograph of the crystalline structure of a glass-ceramic comprising a crystalline phase having a jeffbenite crystalline structure.
Figure 4:
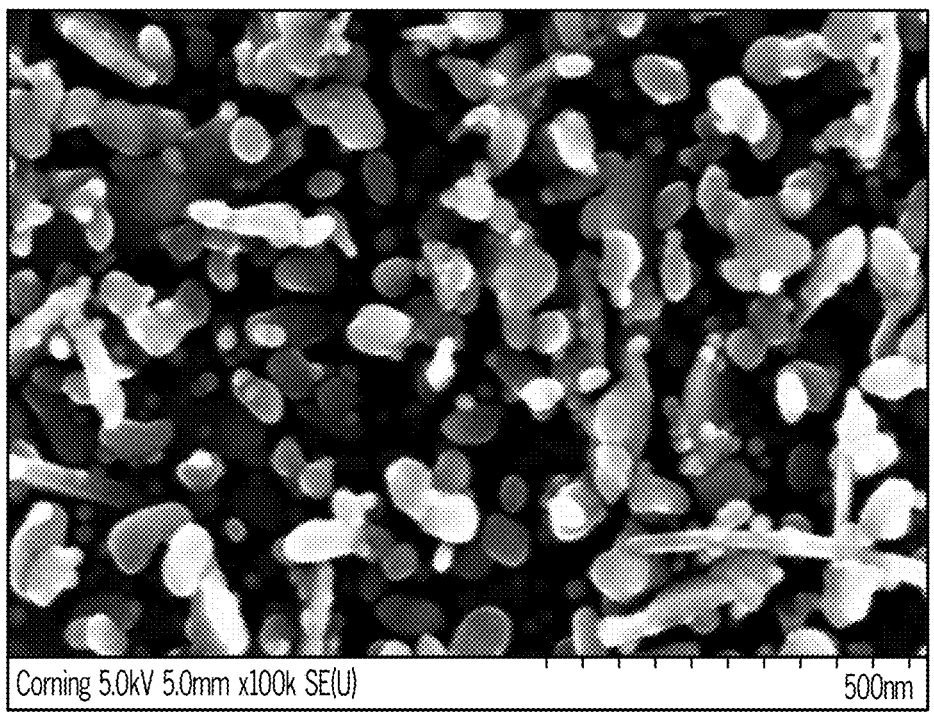
FIG. 4 is an SEM micrograph of the crystalline structure of a glass-ceramic comprising a crystalline phase having a jeffbenite crystalline structure.

FIG. 3 depicts the microstructure of the glass-ceramic of Example A after heat treatment at a first temperature of 725° C. for 4 hours and at a second temperature of 850° C. for 2 hours. FIG. 4 depicts the microstructure of the glass-ceramic of Example B after heat treatment at a first temperature of 725° C. for 4 hours and at a second temperature of 850° C. for 4 hours. FIG. 3 also depicts $ZrO_2$ crystals (lighter colored areas) in the microstructure of the glass-ceramic.

Figure 5:
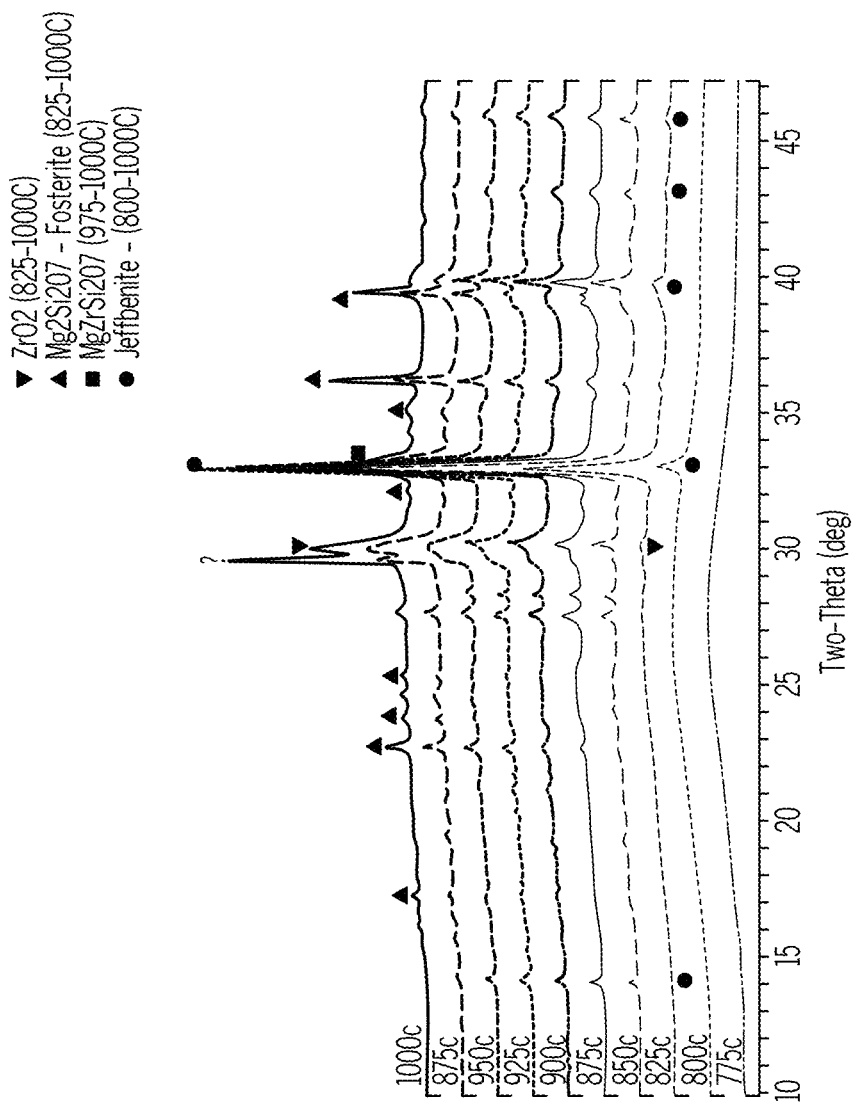
FIG. 5 is a high temperature x-ray diffraction two-theta plot indicating the ranges of stability of the various crystalline phases in glass-ceramic comprising a crystalline phase having a jeffbenite crystalline structure and a tetragonal zirconia crystalline phase as a function of temperature.
Figure 6A:
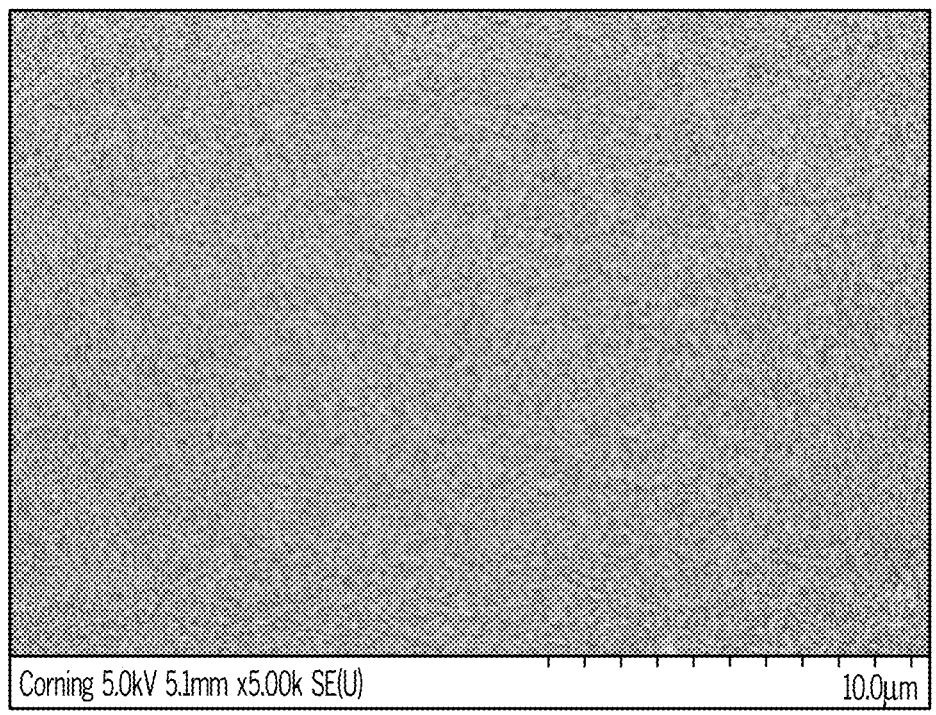
FIG. 6A is an SEM micrograph of the crystalline structure of a glass-ceramic comprising a crystalline phase having a jeffbenite crystalline structure.
Figure 6B:
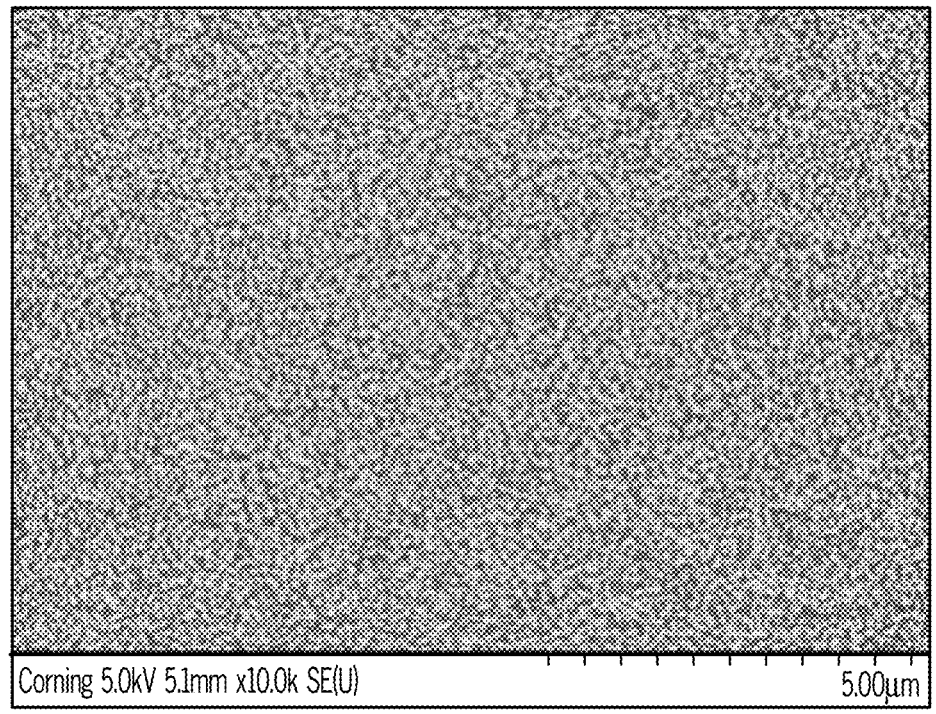
FIG. 6B is an SEM micrograph of the crystalline structure of a glass-ceramic comprising a crystalline phase having a jeffbenite crystalline structure.
Figure 6C:
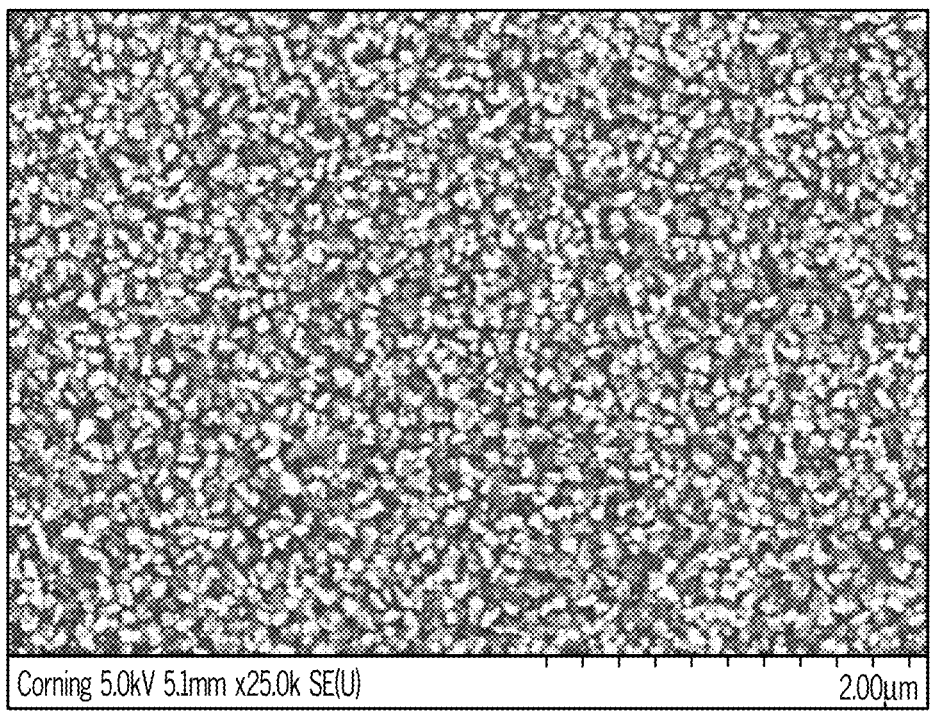
FIG. 6C is an SEM micrograph of the crystalline structure of a glass-ceramic comprising a crystalline phase having a jeffbenite crystalline structure.
Figure 6D:
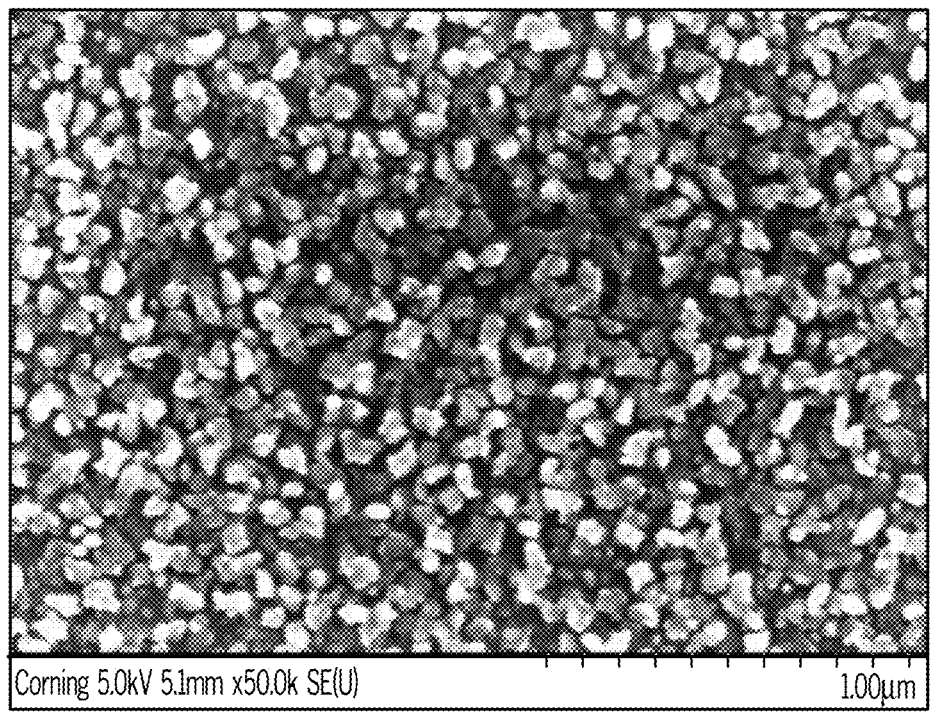
FIG. 6D is an SEM micrograph of the crystalline structure of a glass-ceramic comprising a crystalline phase having a jeffbenite crystalline structure.
Figure 6E:
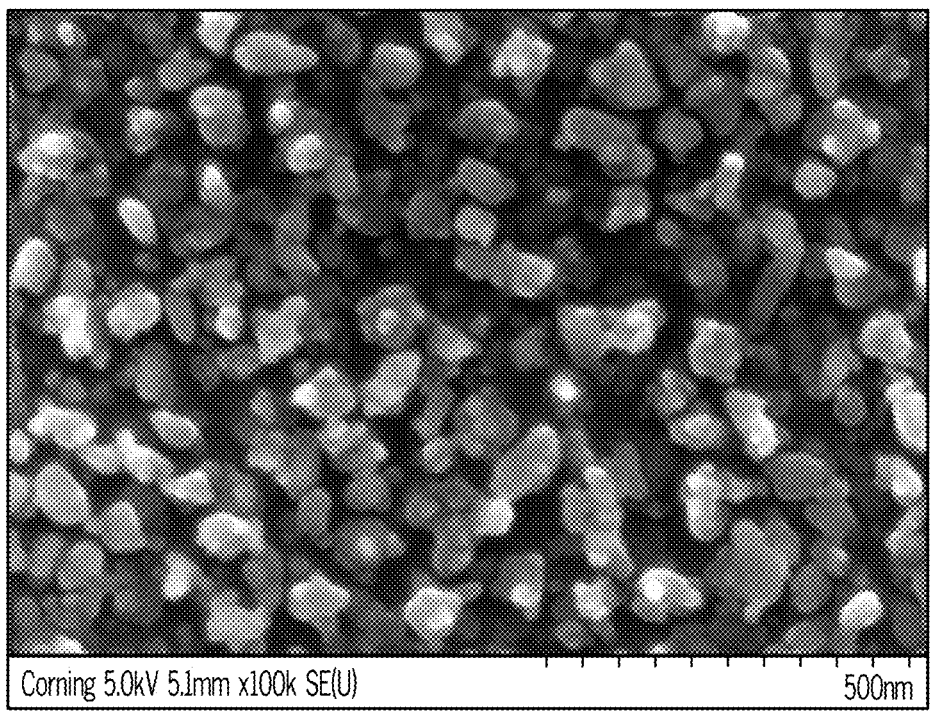
FIG. 6E is an SEM micrograph of the crystalline structure of a glass-ceramic comprising a crystalline phase having a jeffbenite crystalline structure.
Figure 6F:
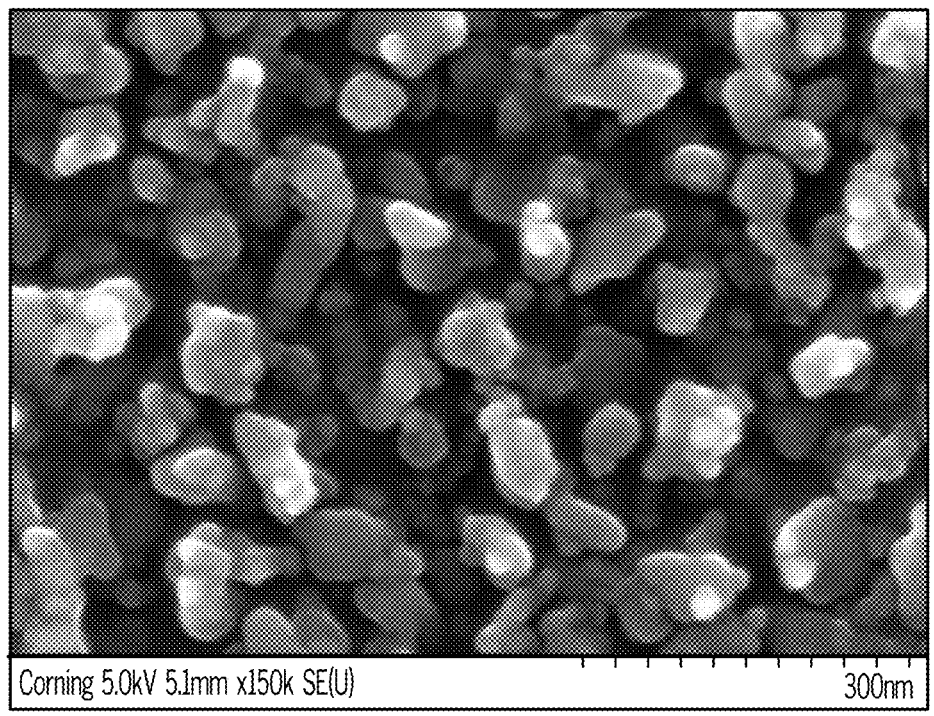
FIG. 6F is an SEM micrograph of the crystalline structure of a glass-ceramic comprising a crystalline phase having a jeffbenite crystalline structure.

A sample of the glass-ceramic composition of Example B was analyzed by high temperature x-ray diffraction (XRD). The sample was held for one hour at each of the following temperatures: 800° C., 825° C., 850° C., 875° C., 900° C., 925° C., 950° C., 975° C., and 1000° C. The XRD spectrum of the sample was obtained in the last fifteen minutes during which the sample was held at a specific temperature. The XRD spectra are depicted in FIG. 5. The high temperature XRD analysis indicates the ranges of stability of various crystalline phases in the sample. As depicted in FIG. 5, the sample included a crystalline phase having a jeffbenite crystalline structure and a tetragonal $ZrO_2$ crystalline phase.

The surface of the glass-ceramic of Example A was observed by scanning electron microscopy (SEM). The sample appeared to be translucent. To enable imaging by SEM, the surface of the sample was etched in 0.5% HF for 10 seconds. Then, a conductive carbon coating was evaporated on the sample to reduce charging. SEM images were taken of the surface of the sample using a Hitachi SU70, 5 kv scanning electron microscope. SEM images were obtained at magnifications from 5K to 150K. FIGS. 6A-6F depict the surface of the sample. The magnification of the SEM micrograph increases from FIG. 6A to FIG. 6F. The grain size of the crystals in the sample were determined to be about 30 nm.

Figure 7:
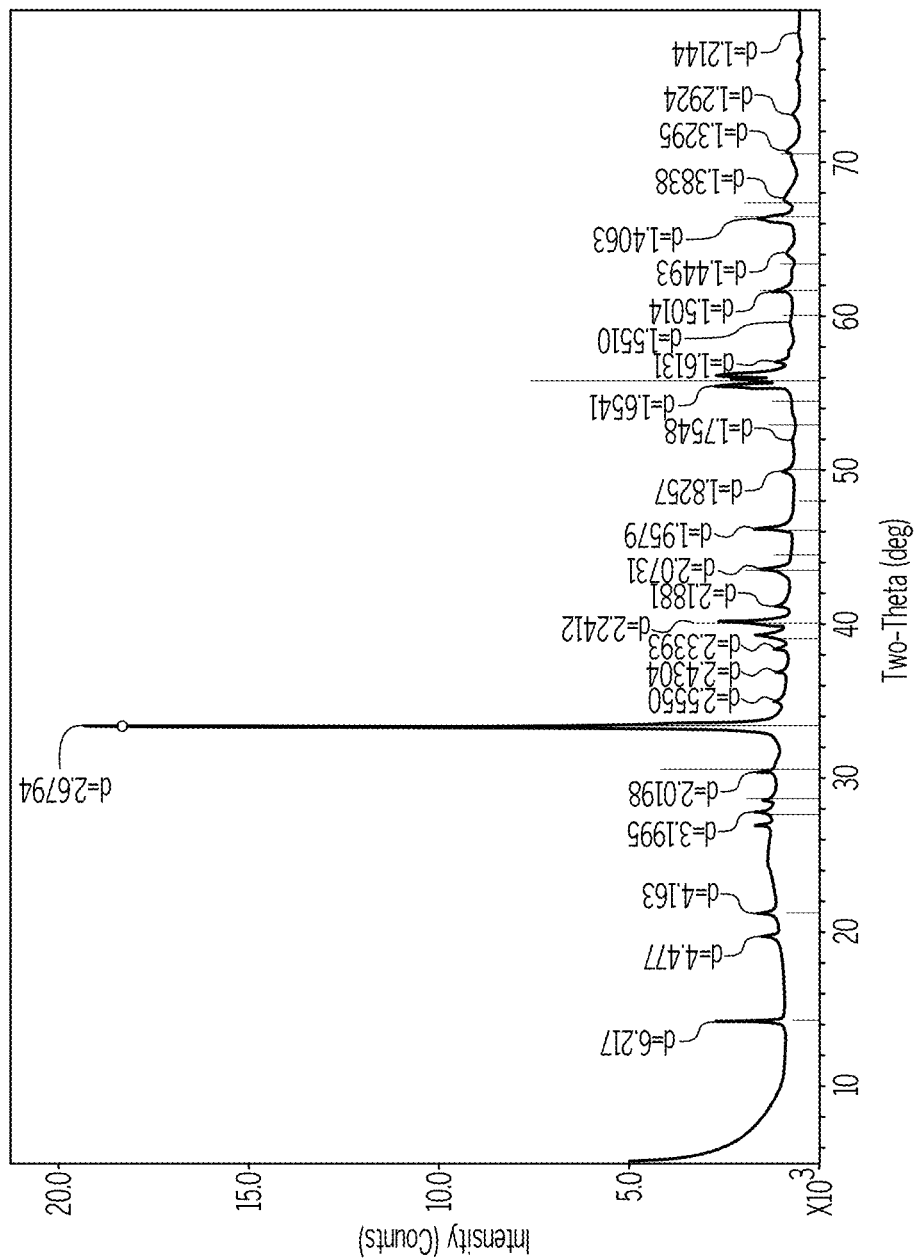
FIG. 7 is an x-ray diffraction two-theta plot indicating a crystalline phase having a jeffbenite crystalline structure in an example glass-ceramic article.

Referring now to FIG. 7, a sample of the precursor glass composition of Example P was heat treated at 780° C. for 4 hours and 850° C. for 4 hours to form a glass-ceramic. The resultant glass-ceramic was then analyzed by x-ray diffraction resulting in the diffraction pattern depicted in FIG. 7. The x-ray diffraction pattern depicted in FIG. 7 shows that compositions in which a portion of MgO is substituted for ZnO (in this case 21.5% of the MgO was replaced with ZnO) may still result in the formation of a crystalline phase having a jeffbenite crystalline structure upon heat treatment without producing other crystalline phases.

Samples formed from the composition of Example A and having a thickness of 0.6 mm were heat treated at 725° C. for 4 hours and 850° C. for 4 hours to form glass-ceramics (hereinafter Examples HH). Samples formed from the composition of Example A and having a thickness of 0.6 mm were heat treated at 775° C. for 4 hours and 850° C. for 4 hours to form glass-ceramics (hereinafter Examples II). Samples of Examples HH and II were then ion exchanged in a bath of 100 wt % $KNO_3$ for 1 hour, 2 hours, 4 hours, 8 hours, 16 hours, and 32 hours. The samples were then analyzed to determine the maximum surface compressive stress and maximum central tension as a function of ion exchange time. The results are reported in Table 2.

TABLE 2

| Sample | Ion Exchange time (hours) | Maximum Central Tension (MPa) | Surface Compressive Stress (MPa) |
| --- | --- | --- | --- |
| HH | 1 | 51.62 | 350.43 |
| HH | 2 | 84.04 | 189.28 |
| HH | 4 | 102.10 | 268.21 |
| HH | 8 | 155.04 | 241.30 |
| HH | 16 | 187.08 | 309.39 |
| HH | 32 | 157.98 | 260.74 |
| II | 1 | 47.15 | 336.61 |
| II | 2 | 70.40 | 468.29 |
| II | 4 | 93.53 | 690.57 |
| II | 8 | 135.80 | 296.62 |
| II | 16 | 177.50 | 253.39 |
| II | 32 | 153.98 | 330.68 |

As indicated in Table 2, maximum central tensions of up to 187.08 MPa and maximum surface compressive stresses of 690.57 MPa were achieved with different ion exchange times, indicating that the stress profile in the glass-ceramics could be tailored to meet different performance criteria.

The present Applicants have discovered that the jeffbenite crystalline structure associated with inclusions in "super-deep" diamonds may provide many useful advantages and properties if formed in glass as a crystalline phase of glass-ceramic, as explained herein. The Applicants believe that a crystalline phase having a jeffbenite crystalline structure has never before been grown in or otherwise formed in glass-ceramic. The Applicants further believe that a crystalline phase having a jeffbenite crystalline structure has never before been formed into or otherwise incorporated into glass-ceramic articles, such as sheets of glass-ceramic, glass-ceramic containers, windows, panels, housings, plates, counters, kitchenware, rods, fibers, or other such articles. Further, in contrast to jeffbenite in (anisotropic) diamonds or in isolation, Applicants believe that crystalline phases having a jeffbenite crystalline structure have never been included in articles with isotropic material properties (e.g., properties such as the tensile strength, elasticity, and fracture toughness that remain the same when tested in different directions), as may be effectively achieved by inclusion of relatively small crystal grains, as disclosed herein, randomly-oriented and homogenously distributed within the residual glass, to form glass-ceramic, or within another isotropic solid media (e.g., polymer). Applicants believe that a crystalline phase having a jeffbenite crystalline structure has never before been manufactured as disclosed herein, even in nature, grown from precursor glasses, as disclosed herein, and at temperatures (e.g., <1600K, <1400K) and pressures (e.g., <12 GPa, such as <10 GPa, <8 GPa, <1 GPa, such as even 1 atm), as disclosed herein. Enabled by the present discoveries, large volumes of crystals having the jeffbenite crystalline structure may be now produced in a single batch, in part because extreme temperatures and pressures, associated with formation super-deep within the Earth's mantle, are unnecessary.

Furthermore, the glass-ceramics described herein may achieve hardness and stiffness values greater than conventional glass-ceramics, and therefore enable thinner and lighter mobile phone and tablet display faces than conventional precursor glasses and glass-ceramics used in existing devices. The same features allow opaque or colored glass-ceramics for phone and tablet housings. Moreover, these glass-ceramics may be free of lithium and still amenable to strengthening by ion exchange, so increasing prices of lithium raw materials will not result in increased cost.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-ceramic article comprising:
a first surface;
a second surface opposite the first surface;
a perimeter defining a shape of the glass-ceramic article; and
a phase assemblage comprising one or more crystalline phases and a glass phase, the one or more crystalline phases comprising a crystalline phase comprising a jeffbenite crystalline structure.

2. The glass-ceramic article of claim 1, wherein the crystalline phase comprising the jeffbenite crystalline structure is a primary crystalline phase.

3. The glass-ceramic article of claim 1, wherein the crystalline phase comprising the jeffbenite crystalline structure has a composition according to the formula:

$$(Mg,R^{2+})_{3+x}(Zr,R^{4+})_xAl_{2-2x}Si_3O_{12},$$

where $R^{2+}$ are divalent metal cations, $R^{4+}$ are tetravalent metal cations, and x is greater than or equal to 0 to less than 1.

4. The glass-ceramic article of claim 1, wherein the crystalline phase comprising the jeffbenite crystalline structure has a composition according to the formula:

$$(Mg,Fe,Mn,Zn)_{3+x}(Zr,Ti,Sn)_xAl_{2-2x}Si_3O_{12},$$

where x is greater than or equal to 0 to less than 1.

5. The glass-ceramic article of claim 1, wherein the crystalline phase comprising the jeffbenite crystalline structure has a composition according to the formula:

$$Mg_{3+x}Zr_xAl_{2-2x}Si_3O_{12},$$

where x is greater than or equal to 0 to less than 1.

6. The glass-ceramic article of claim 1, wherein at least some grains of the crystalline phase comprising the jeffbenite crystalline structure have a largest dimension greater than or equal to 20 nm to less than or equal to 100 nm.

7. A glass-ceramic article comprising:
greater than or equal to 35 mol. % to less than or equal to 65 mol. % $SiO_2$;
greater than or equal to 5 mol. % to less than or equal to 20 mol. % $Al_2O_3$;
greater than or equal to 10 mol. % to less than or equal to 45 mol. % MgO;
greater than or equal to 1 mol. % to less than or equal to 7 mol. % $ZrO_2$;
greater than or equal to 0 mol. % to less than or equal to 15 mol. % $Na_2O$;
greater than or equal to 0 mol. % to less than or equal to 15 mol. % $K_2O$;
greater than or equal to 0 mol. % to less than or equal to 9 mol. % FeO;
greater than or equal to 0 mol. % to less than or equal to 1 mol. % $MnO_2$; and
greater than or equal to 0 mol. % to less than or equal to 12 mol. % ZnO, wherein the glass-ceramic article comprises a glass phase and a crystalline phase having a jeffbenite crystalline structure.

8. The glass-ceramic article of claim 7, wherein the crystalline phase comprising the jeffbenite crystalline structure is a primary crystalline phase.

9. The glass-ceramic article of claim 7, comprising greater than or equal to 1 mol. % to less than or equal to 15 mol. % $Na_2O$.

10. The glass-ceramic article of claim 7, comprising greater than or equal to 1 mol. % to less than or equal to 15 mol. % $K_2O$.

11. The glass-ceramic article of claim 7, wherein $Na_2O$ (mol. %)+$K_2O$ (mol. %) is greater than or equal to 2 mol. % to less than or equal to 15 mol. %.

12. The glass-ceramic article of claim 7, wherein $Na_2O$ (mol. %)/($Na_2O$ (mol. %)+$K_2O$ (mol. %)) is greater than or equal to 0.3.

13. The glass-ceramic article of claim 7, further comprising greater than or equal to 0.3 mol. % to less than or equal to 7 mol. % $TiO_2$.

14. The glass-ceramic article of claim 13, wherein $ZrO_2$ (mol. %)+$TiO_2$ (mol. %) is greater than or equal to 2 mol. %.

15. The glass-ceramic article of claim 13, wherein $ZrO_2$ (mol. %)/($ZrO_2$ (mol. %)+$TiO_2$ (mol. %)) is greater than or equal to 0.3.

16. The glass-ceramic article of claim 7, comprising greater than or equal to 1 mol. % to less than or equal to 12 mol. % ZnO.

17. The glass-ceramic article of claim 7, further comprising less than or equal to 3 mol. % $Li_2O$.

18. The glass-ceramic article of claim 7, further comprising greater than or equal to 1 mol. % to less than or equal to 8 mol. % BaO.

19. The glass-ceramic article of claim 7, further comprising greater than or equal to 0.2 mol. % to less than or equal to 1.7 mol. % of at least one of CaO and SrO.

20. The glass-ceramic article of claim 7, wherein the glass-ceramic article is substantially free of $P_2O_5$.

21. A glass-ceramic article, comprising:
a first major surface and a second major surface facing away from the first major surface, edges forming a perimeter of the first and second major surfaces and extending between the first and second major surfaces;
wherein a thickness of the article is defined as distance between the first and second major surfaces, a width of the article is defined as a distance along the first major surface orthogonal to the thickness and between the edges, and a length of the article is defined as a distance along the first major surface orthogonal to both the width and thickness and between the edges;
wherein the width is greater than or equal to the thickness;
wherein the length is greater than or equal to the width; and
a body between the first major surface, the second major surface, and the edges,
wherein the body comprises glass-ceramic,
wherein the glass-ceramic comprises a crystalline phase having a jeffbenite crystalline structure;
wherein the glass-ceramic article is a sheet.

22. The glass-ceramic article of claim 21, wherein grains of the crystalline phase having the jeffbenite crystalline structure are homogeneously distributed throughout the glass-ceramic of the body.

23. The glass-ceramic article of claim 21, wherein grains of the crystalline phase having the jeffbenite crystalline structure are randomly oriented within the glass-ceramic of the body.

24. The glass-ceramic article of claim 21, wherein grains of the crystalline phase having the jeffbenite crystalline structure overlap and interlock with one another within the glass-ceramic of the body.

25. The glass-ceramic article of claim 21, wherein the glass-ceramic has isotropic material properties.

26. The glass-ceramic article of claim 21, wherein the thickness is greater than or equal to 200 μm and less than or equal to 5 mm.

27. The glass-ceramic article of claim 21, wherein the length and the width are both greater than 5 mm.

28. The glass-ceramic article of claim 21, wherein the body consists essentially of the glass-ceramic, and wherein the body is at least partially translucent such that at least 20% of light of 400 to 800 nanometers wavelength directed into the thickness of the sheet passes through the body.

29. A glass-ceramic article, comprising:
   crystals of pyrope-almandine garnet stoichiometry with tetragonal structure; and
   amorphous glass surrounding and enveloping the crystals such that the crystals and glass together form the glass-ceramic of the glass-ceramic article.

30. The glass-ceramic article of claim 29, wherein the tetragonal structure falls within the I-42d space group.

* * * * *